United States Patent
Jeon et al.

(10) Patent No.: US 10,718,894 B2
(45) Date of Patent: Jul. 21, 2020

(54) DISPLAY MODULE AND DISPLAY DEVICE INCLUDING THE SAME

(71) Applicant: Samsung Display Co., Ltd., Yongin-Si, Gyeonggi-Do (KR)

(72) Inventors: Jae-hwan Jeon, Seongnam-si (KR); Seonghyun Go, Yongin-si (KR); Bongchun Park, Incheon (KR); Seul Lee, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 16/299,388

(22) Filed: Mar. 12, 2019

(65) Prior Publication Data
US 2019/0285793 A1   Sep. 19, 2019

(30) Foreign Application Priority Data
Mar. 14, 2018   (KR) .................. 10-2018-0029866

(51) Int. Cl.
G02B 6/00   (2006.01)
F21V 8/00   (2006.01)

(52) U.S. Cl.
CPC .................... *G02B 6/0088* (2013.01)

(58) Field of Classification Search
CPC ......... G02F 1/133308; G02F 1/133608; G02F 1/133615; G02B 6/0088
See application file for complete search history.

(56) References Cited

U.S. PATENT DOCUMENTS

| 9,323,084 B2 | 4/2016 | Lee et al. |
| 9,874,680 B2 | 1/2018 | Yu |
| 2013/0010497 A1* | 1/2013 | Lee .................. G02B 6/0088 362/611 |

FOREIGN PATENT DOCUMENTS

| JP | 3266475 | 3/2002 |
| KR | 10-1420521 | 7/2014 |
| KR | 10-1640705 | 7/2016 |
| KR | 10-1766810 | 8/2017 |
| KR | 10-2017-0101328 | 9/2017 |

\* cited by examiner

*Primary Examiner* — Anne M Hines
(74) *Attorney, Agent, or Firm* — F. Chau & Associates, LLC

(57) ABSTRACT

A display module includes a light guide plate; a display panel disposed on the light guide plate; and a plurality of fixing parts disposed between an edge of the light guide plate and an edge of the display panel. The fixing parts are spaced apart from each other, and each of the fixing parts includes: a sidewall portion facing a side surface of the light guide plate; a bottom portion extended from a first end of the sidewall portion to face the light guide plate; and a ceiling portion extended from a second end, opposite the first end, of the sidewall portion to face the display panel.

20 Claims, 21 Drawing Sheets

DISPLAY MODULE AND DISPLAY DEVICE INCLUDING THE SAME

CROSS-REFERENCE TO RELATED APPLICATION

This U.S. non-provisional patent application claims priority under 35 U.S.C. § 119 to Korean Patent Application No. 10-2018-0029866, filed on Mar. 14, 2018, the disclosure of which is incorporated by reference herein in its entirety.

TECHNICAL FIELD

The present invention relates to a display module and a display device, and more particularly, to a display module including a fixing part and a display panel, and a display device including the display module.

DISCUSSION OF THE RELATED ART

Flat panel display devices such as a liquid crystal display device and an organic electric field light emitting display device are used in various kinds of data processing devices such as a television, a monitor, a notebook computer, and a mobile phone to display an image of processed data. As the number of applications of flat panel display devices has increased, curved display devices have been developed in addition to flat panel display devices.

A display module, in which a display panel and optical members are coupled to each other, may be deformed into various shapes to be disposed in housings for flat panel display devices or curved display devices. However, shapes of coupling members for coupling the optical members to the display panel in a display module are adjusted in consideration of shapes of the provided housings.

SUMMARY

According to an exemplary embodiment of the present invention, a display module includes a light guide plate; a display panel disposed on the light guide plate; and a plurality of fixing parts disposed between an edge of the light guide plate and an edge of the display panel. The fixing parts are spaced apart from each other, and each of the fixing parts includes: a sidewall portion facing a side surface of the light guide plate; a bottom portion extended from a first end of the sidewall portion to face the light guide plate; and a ceiling portion extended from a second end, opposite the first end, of the sidewall portion to face the display panel.

In an exemplary embodiment of the present invention, the light guide plate includes a top surface and a bottom surface, which face each other; and a plurality of side surfaces disposed between the top surface and the bottom surface, the plurality of side surfaces comprising a light incident surface, and the fixing parts overlap the plurality of side surfaces except for the light incident surface.

In an exemplary embodiment of the present invention, the light guide plate has a rectangular shape having first and second long sides and first and second short sides, the first long side has a length of L, and at least one of the fixing parts is disposed on the first long side at a distance between a length equal to or greater than about L/3 and a length equal to or less than about L/2 from a first end of the first long side.

In an exemplary embodiment of the present invention, at least one of the fixing parts is disposed on the first long side at a distance from the first end of the first long side between a length greater than about L/2 and a length equal to or less than about 2L/3 from the first end of the first long side.

In an exemplary embodiment of the present invention, at least four fixing parts are disposed on the first long side.

In an exemplary embodiment of the present invention, the bottom portion and the ceiling portion are parallel to each other, and the bottom portion has an extension direction that is the same as that of the ceiling portion.

In an exemplary embodiment of the present invention, the bottom portion and the ceiling portion are parallel to each other, and the bottom portion has an extension direction that is opposite to that of the ceiling portion.

In an exemplary embodiment of the present invention, the ceiling portion overlaps the light guide plate and the display panel.

In an exemplary embodiment of the present invention, the bottom portion overlaps the light guide plate and the display panel, and the ceiling portion does not overlap the light guide plate and overlaps the display panel.

In an exemplary embodiment of the present invention, each of the fixing parts further comprises a first screw hole.

In an exemplary embodiment of the present invention, the first screw hole protrudes from the sidewall portion or the bottom portion.

In an exemplary embodiment of the present invention, the display module further includes an optical sheet disposed between the light guide plate and the display panel.

In an exemplary embodiment of the present invention, the display module further includes an adhesion member disposed between the light guide plate and the bottom portion of each fixing part and between the ceiling portion of each fixing part and the display panel.

According to an exemplary embodiment of the present invention, a display device includes a display module including a light guide plate, a display panel disposed on the light guide plate, and a plurality of fixing parts overlapping the light guide plate and the display panel. The display device further includes a light source disposed at one side of the display module; and a housing configured to accommodate the display module and the light source. The fixing parts are spaced apart from each other, and each of the fixing parts includes: a sidewall portion facing a side surface of the light guide plate; a bottom portion extended from a first end of the sidewall portion and bent with respect to the sidewall portion to face the light guide plate; and a ceiling portion extended from a second end, opposite the first end, of the sidewall portion and bent with respect to the sidewall portion to face the display panel.

In an exemplary embodiment of the present invention, the light guide plate includes a plurality of side surfaces including a light incident surface, and the fixing parts are disposed on the plurality of side surfaces except for the light incident surface.

In an exemplary embodiment of the present invention, the light guide plate has a rectangular shape having two long sides and two short sides, a first long side of the two long sides has a length of L, and at least one of the fixing parts is disposed on the first long side at a distance between a length equal to or greater than about L/3 and a length equal to or less than about L/2 from a first end of the first long side.

In an exemplary embodiment of the present invention, the housing includes a housing bottom portion facing the light guide plate; a housing side portion covering a side surface of the display module; and a groove in the housing side portion. The groove is configured to receive a screw to couple the housing to the fixing part.

In an exemplary embodiment of the present invention, an adhesion resin is disposed between the housing side portion and the display module.

In an exemplary embodiment of the present invention, each of the fixing parts further includes a screw hole protruding from the sidewall portion or the bottom portion, and the screw hole overlaps the groove.

According to an exemplary embodiment of the present invention, a display device includes a housing including a curved bottom surface; a display module disposed in the housing; and a light source disposed in the housing and disposed at one side of the display module. The display module includes: a light guide plate curved in correspondence to the curved bottom surface; a display panel disposed on the light guide plate and curved in correspondence to the curved bottom surface; and a plurality of fixing parts attached to an end of the curved light guide plate and an end of the curved display panel. the plurality of fixing parts are spaced apart from each other, and each of the fixing parts includes: a sidewall portion facing a side surface of the curved light guide plate; a bottom portion extended from a first end of the sidewall portion and forming a first angle with respect to the sidewall portion to face the curved light guide plate; and a ceiling portion extended from a second end, opposite the first end, of the sidewall portion and forming a second angle with respect to the sidewall portion to face the curved display panel.

According to an exemplary embodiment of the present invention, a display module includes: a light guide plate; a display panel disposed on the light guide plate; and a plurality of fixing parts overlapping a side surface and a lower surface of the light guide plate. The fixing parts are spaced apart from each other, and each of the fixing parts includes: a sidewall portion facing a side surface of the light guide plate; a bottom portion extended from a first end of the sidewall portion and bent at a predetermined angle with respect to the sidewall portion to overlap the lower surface of the light guide plate; and a ceiling portion extended from a second end, opposite the first end, of the sidewall portion and bent at a predetermined angle with respect to the sidewall portion to overlap a lower surface of the display panel.

In an exemplary embodiment of the present invention, the bottom portion is attached to the lower surface of the light guide plate, and the ceiling portion is attached to the lower surface of the display panel.

BRIEF DESCRIPTION OF THE FIGURES

The above and other features of the present invention will become more apparent by describing in detail exemplary embodiments thereof, with reference to the accompanying drawings, in which.

DETAILED DESCRIPTION OF THE EMBODIMENTS

Figure 1:
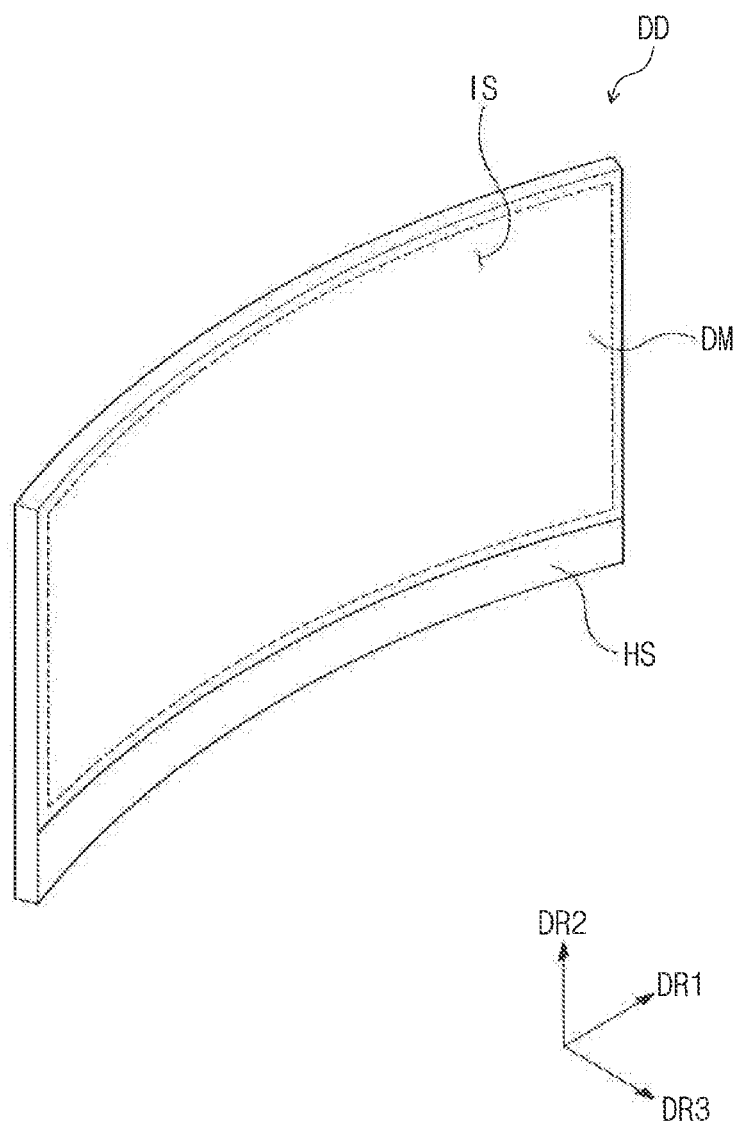
FIG. 1 is a perspective view illustrating a display device according to an exemplary embodiment of the present invention.

Exemplary embodiments of the present invention will now be described more fully with reference to the accompanying drawings.

It is to be understood that the present invention may be embodied in different forms and thus should not be construed as being limited to the exemplary embodiments set forth herein.

In the drawings, like reference numerals may refer to like elements, and thus repetitive descriptions may be omitted. In the drawings, the dimensions and sizes of each element may be exaggerated for clarity.

In the specification, it will be understood that when a layer (or, e.g., a film), a region, or a plate is referred to as being 'on' another layer, region, or plate, it can be directly on the other layer, region, or plate, or intervening layers, regions, or plates may be present.

Hereinafter, a display device and a method for manufacturing the display device according to an exemplary embodiment of the present invention will be described with reference to the accompanying drawings.

Figure 2:
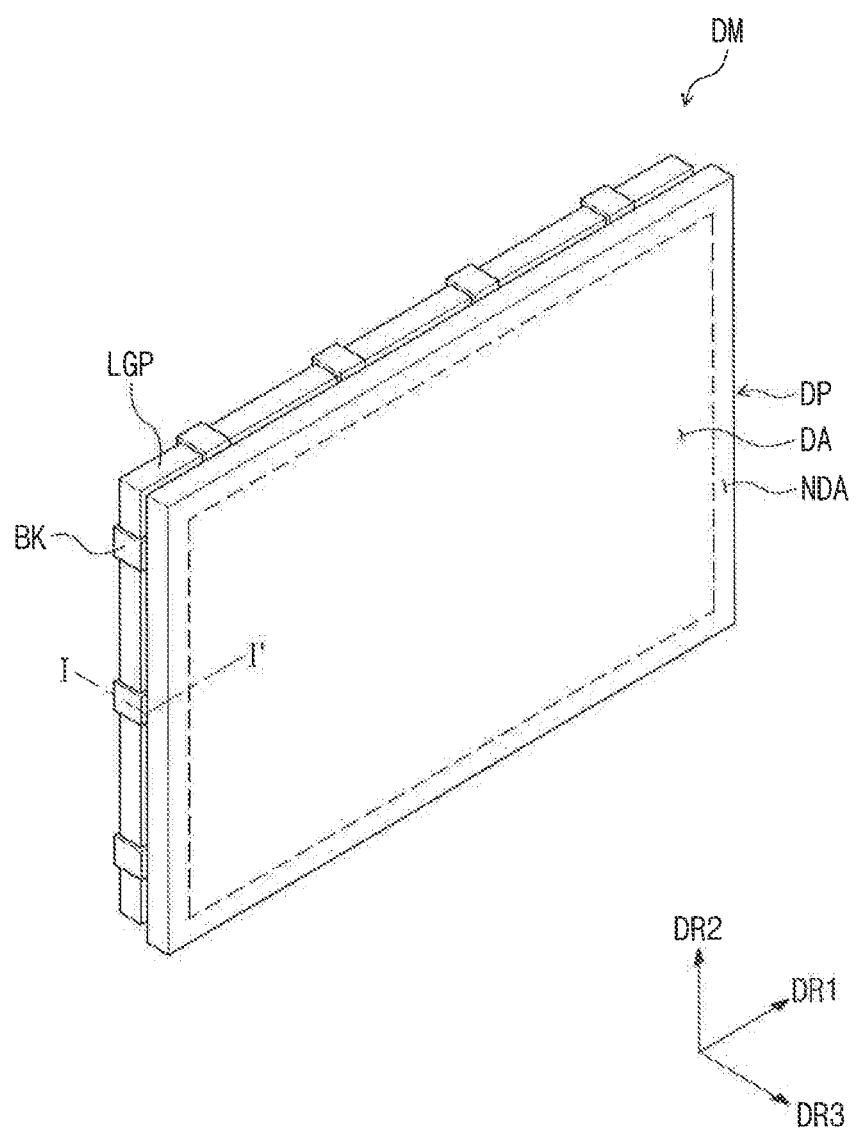
FIG. 2 is a perspective view illustrating a display module according to an exemplary embodiment of the present invention.
Figure 3:
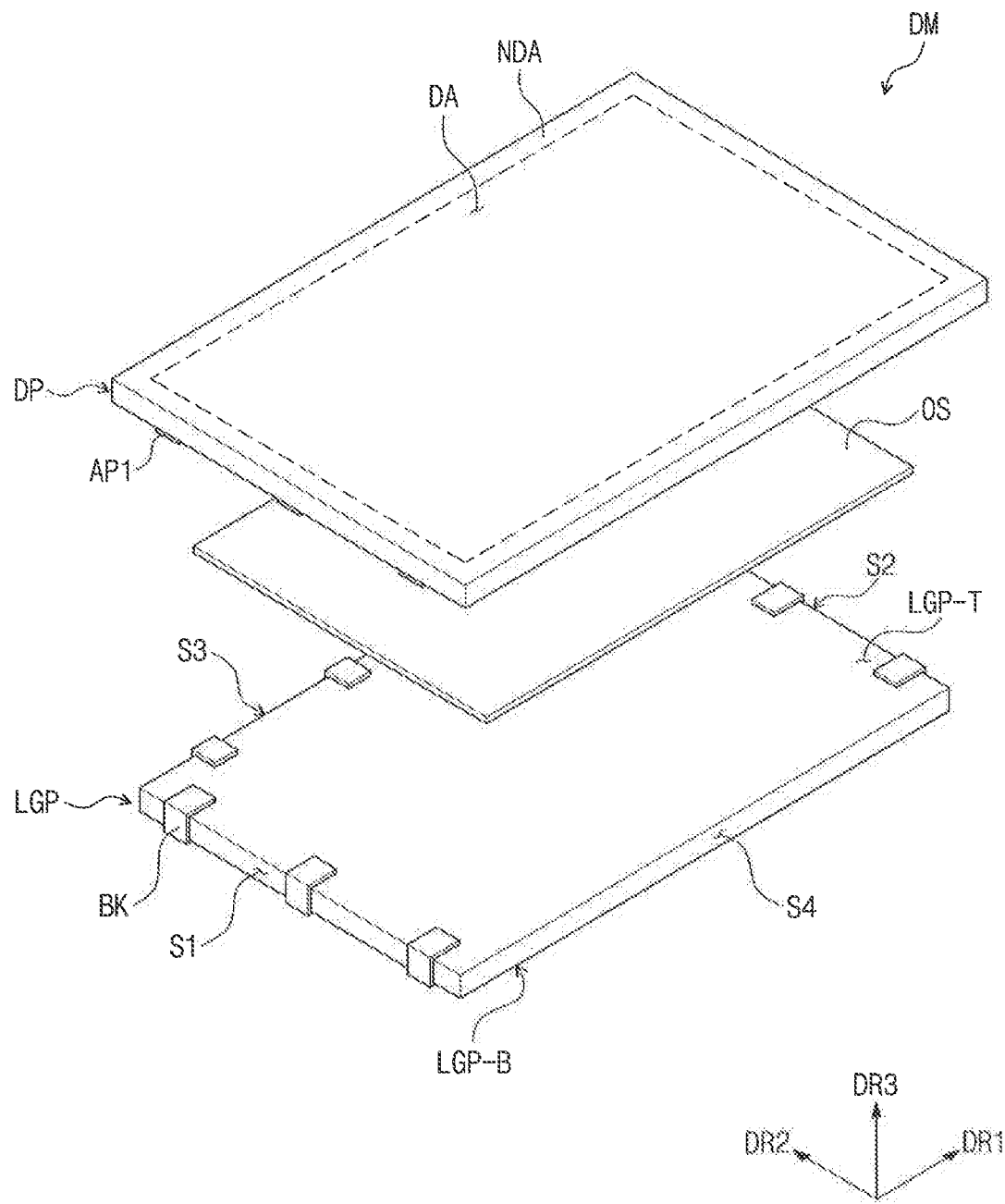
FIG. 3 is an exploded perspective view illustrating a display module according to an exemplary embodiment of the present invention.
Figure 4:
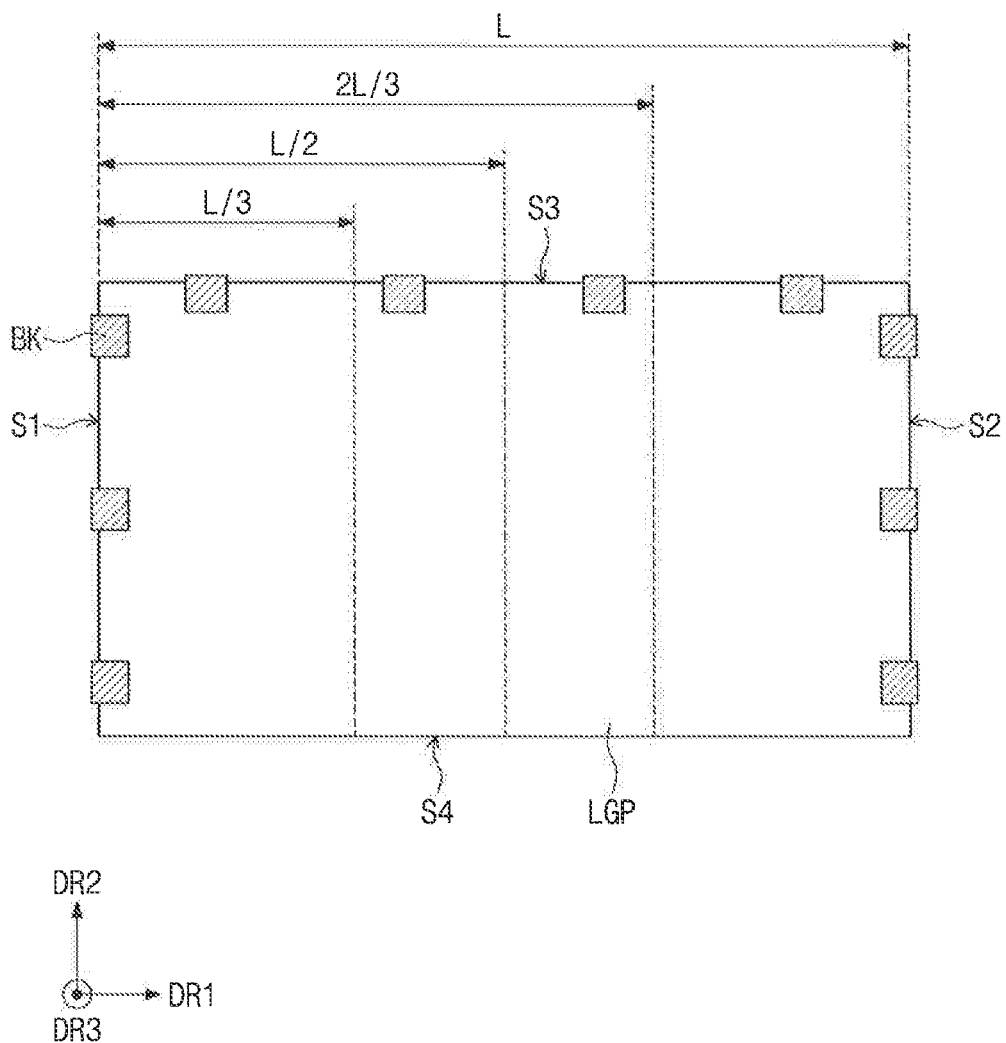
FIG. 4 is a plan view illustrating a light guide plate and a fixing part, which are included in a display module according to an exemplary embodiment of the present invention.

FIG. 1 is a perspective view of a display device according to an exemplary embodiment of the present invention. FIG. 2 is a perspective view of a display module according to an exemplary embodiment of the present invention, and FIG. 3 is an exploded perspective view of the display module according to an exemplary embodiment of the present invention. FIG. 4 is a plan view illustrating a light guide plate and a fixing part, which are included in the display module according to an exemplary embodiment of the present invention. FIGS. 5A, 5B, 5C, 5D, and 5E are views illustrating the fixing part, which is included in the display module according to an exemplary embodiment of the present invention. FIG. 6 is a cross-sectional view taken along line I-I' of FIG. 2 according to an exemplary embodiment of the present invention.

Hereinafter, for convenience of description, a direction which an image is provided from a display device DD may be in an upward direction, and a direction opposite to the upward direction may be a downward direction. In addition, a front surface (or, e.g., a top surface) and a rear surface (or, e.g., a bottom surface) of an element may face each other in a direction along a third directional axis DR3, for example. Referring to FIG. 1, a direction indicated by the third directional axis DR3 may be a normal direction with respect to a surface extending along a first directional axis DR1 and a second directional axis DR2. However, directions indicated by the first to third directional axes DR1, DR2, and DR3 may be a relative concept and changed with respect to each other.

The display device DD according to an exemplary embodiment of the present invention may include a display module DM and a housing HS for accommodating the display module DM. The housing HS may cover one or more side surfaces of the display module DM. The display module DM may include a display surface IS, and the display surface IS may not be covered by the housing HS and may provide an image. A bottom surface, which faces the display surface IS, of the display module DM may not be covered by the housing HS. However, the present invention is not limited thereto. For example, the housing HS may cover at least a portion of the display surface IS. For example, referring to FIG. 1, the housing HS may cover a portion of the display surface IS, which is adjacent to one end of the display module DM. In other words, the display device DD according to an exemplary embodiment of the present invention may include the housing HS covering only a portion of the display surface IS, or the display device DD may be a frameless or three surface frameless display device. However, exemplary embodiments of the present invention are not limited thereto. For example, the housing HS may cover multiple portions of the display surface IS. In addition, the housing HS may accommodate a light source LU (e.g., refer to FIG. 12) for providing light to a display panel DP.

For example, the display device DD may have a curved surface. The housing HS may have a curved shape, and the display module DM accommodated in the housing HS may have a curved surface that is curved along the curved shape of the housing HS. For example, the display surface IS of the display module DM may have a curved shape that extends in the first directional axis DR1. Further, the display surface IS may be curved toward the third directional axis DR3.

In an exemplary embodiment of the present invention of FIG. 1, the display device DD may have a curved shape that extends along the first directional axis DR1. Accordingly, the display device DD may have a long side having a curved shape extending along the first directional axis DR1 and a short side having a linear shape parallel to the second directional axis DR2 that is substantially perpendicular to the first directional axis DR1. For example, the long side of the display device DD may be curved in the third directional axis DR3. However, exemplary embodiments of the present invention are not limited thereto. For example, the display device DD may have a curved-surface that is curved along at least one of the first directional axis DR1 and the second directional axis DR2.

The display device DD may have a shape that is recessed in the upward direction (e.g., the third directional axis DR3) in which an image is provided, e.g., a shape protruding in the downward direction (e.g., a direction opposite to the third directional axis DR3). However, exemplary embodiments of the present invention are not limited thereto. For example, the display device DD may have a shape protruding in the upward direction. Although the display device DD according to an exemplary embodiment of the present invention has a curved shape in FIG. 1, the display device DD according to an exemplary embodiment of the present invention may have a flat shape.

The display module DM included in the display device DD according to an exemplary embodiment of the present invention may include a light guide plate LGP, a display panel DP, and a plurality of fixing parts BK coupling the light guide plate LGP to the display panel DP. In an exemplary embodiment of the present invention, the display panel DP may be disposed on the light guide plate LGP. The fixing part BK may be, for example, a bracket or a clamp that serves to couple and fix the light guide plate LGP to the display panel DP and/or support the display panel DP and the light guide plate LGP. In addition, the display module DM may further include an optical sheet OS disposed between the light guide plate LGP and the display panel DP.

The light guide plate LGP may guide light provided from the light source LU (refer to, e.g., FIG. 12) included in the display device DD to the display panel DP. The light guide plate LGP may be made of, for example, glass or a polymer material. The light guide plate LGP may have a top surface LGP-T facing to the display panel DP, a bottom surface LGP-B facing the top surface LGP-T, and side surfaces S1, S2, S3, and S4 disposed between the top surface LGP-T and the bottom surface LGP-B. For example, the top surface LGP-T may be adjacent to the display panel DP. In addition, at least one side surface of the side surfaces S1, S2, S3, and S4 of the light guide plate LGP may be a light incident surface to which light emitted from the light source LU (refer to, e.g., FIG. 12) is incident. For example, the light incident surface of the light guide plate LGP in the display module DM in FIGS. 2 to 4 according to an exemplary embodiment of the present invention may be a fourth side surface S4. Light incident into the light guide plate LGP through the light incident surface of the light guide plate LGP may be guided toward the display panel DP. In addition, the top surface LGP-T adjacent to the display panel DP may be a light output surface from which light guided by the light guide plate LGP may be outputted.

The light guide plate LGP may include a plurality of light guide patterns to transmit the light provided from the light source LU (refer to, e.g., FIG. 12) to the display panel DP. For example, the light guide patterns may be provided on the bottom surface LGP-B of the light guide plate LGP.

The light guide plate LGP may have a quadrangular shape on a plane. For example, the light guide plate LGP may have a rectangular shape. The light guide plate LGP may have a rectangular shape having a pair of long sides and a pair of short sides on the plane. In this specification, an extension direction of the long side of the light guide plate LGP is in the same direction as the first directional axis DR1, an extension direction of the short side of the light guide plate LGP is in the same direction as the second directional axis DR2, and a thickness direction of the light guide plate LGP is in the same direction as the third directional axis DR3. However, exemplary embodiments of the present invention are not limited to the illustrations in FIGS. 1 to 3. For example, the directions of the long side and the short side may be switched with one another.

Although the light incident surface of the light guide plate LGP is the fourth side surface S4, and the fixing parts BK are disposed on the first to third side surfaces S1, S2, and S3 of the light guide plate LGP in FIGS. 1 to 3 according to an exemplary embodiment of the present invention, the light incident surface of the light guide plate LGP may be at least one of the first side surface S1 and the second side surface S2. In this case, the fixing parts BK may be spaced apart from each other on the third side surface S3 and the fourth side surface S4.

The display panel DP may be disposed on the light guide plate LGP. The display panel DP may be, for example, a liquid crystal display panel. In an exemplary embodiment of the present invention, the display panel DP may display an image by using the light emitted from the light source LU (refer to, e.g., FIG. 12) and provided through the light guide plate LGP. However, exemplary embodiments of the present invention are not limited to the kind of display panel DP included in the display device DD according to an exemplary embodiment of the present invention. For example, the display panel DP may be a different kind of display panel such as a nano-crystal display panel, an electrophoretic display panel, and an electro-wetting display panel.

The display panel DP included in the display module DM according to an exemplary embodiment of the present invention may have, for example, a rectangular shape having two pairs of sides that are parallel to each other on the plane. The shape of the display panel DP may correspond to that of the light guide plate LGP. For example, the display panel DP according to an exemplary embodiment of the present invention may have a long side and a short side, which correspond to those of the light guide plate LGP, respectively. In addition, the long side and short side of the display panel DP may be equal to or greater in length than those of the light guide plate LGP, respectively. For example, the long side and short side of the display panel DP may be greater in length than those of the light guide plate LGP, respectively.

In an exemplary embodiment of the present invention, the display panel DP may be flexible. For example, the display panel DP may be flat or curved in an initially provided state, and then, in a final state in which the display panel DP is assembled into the display device DD, the display panel DP may have a different shape that may be deformed from the initially provided state.

The display panel DP may be curved in various manners. For example, the display panel DP may be curved to protrude in the downward direction or the upward direction. However, exemplary embodiments of the present invention are not limited thereto. The display panel DP and the display module DM including the same may each have a shape that corresponds to the shape of the housing HS of the display device DD.

In addition, the display panel DP may be rigid and without flexibility while having a curved initial shape. For example, the display panel DP may have a fixed shape that is curved to protrude in the downward direction or the upward direction.

The display panel DP may have a display area DA on which an image is displayed and a non-display area NDA disposed adjacent to at least one side of the display area DA and outside the display area DA. For example, the non-display area NDA may partially surround the display area DA. In addition, a portion of the non-display area NDA of the display panel DP may be covered by the housing HS.

The display module DM according to an exemplary embodiment of the present invention includes a plurality of fixing parts BK coupling the light guide plate LGP to the display panel DP. The fixing parts BK may couple an edge of the light guide plate LGP to a corresponding edge of the display panel DP. For example, the fixing parts BK may couple an edge of the light guide plate LGP to an adjacent edge of the display panel DP. The fixing parts BK may be arranged while being spaced apart from each other. The fixing parts BK may be arranged on at least one side surface of the four side surfaces S1, S2, S3, and S4 of the light guide plate LGP. For example, the fixing parts BK may be arranged on at least one side surface of the rest of the side surfaces S1, S2, and S3 of the light guide plate LGP except for one side surface (e.g., the fourth side surface S4) that is the light incident surface. For example, the fixing parts BK may be arranged while being spaced apart from each other on all of the side surfaces S1, S2, and S3 of the light guide plate LGP except for the fourth side surface S4 that corresponds to the light incident surface. In other words, the fixing parts BK may be arranged on the first to third side surfaces S1, S2, and S3 of the light guide plate LGP except for the fourth side surface S4 of the light guide plate LGP.

Each of the fixing parts BK may be made of, for example, a metallic material or a polymer material. For example, the fixing part BK may be made of a material containing stainless steel, galvalume, and/or aluminum.

FIG. 4 is a plan view illustrating the light guide plate LGP and a fixing part BK, which are included in the display module DM in FIG. 2 according to an exemplary embodiment of the present invention. Referring to FIG. 4, the fixing parts BK may be spaced apart from each other on the three side surfaces S1, S2, and S3 of the light guide plate LGP. However, the fixing parts BK may not be arranged on the light incident surface of the light guide plate LGP. For example, the fixing parts BK may not be arranged on the fourth side surface S4.

However, exemplary embodiments of the present invention are not limited thereto. For example, unlike the illustrations of FIGS. 2 to 4, the fixing parts BK may be arranged on the side surfaces corresponding to one pair of long sides of the light guide plate LGP or the side surfaces corresponding to one pair of short sides of the light guide plate LGP. Even in this case, the fixing parts BK may not be arranged on the one side surface, which corresponds to the light incident surface, of the light guide plate LGP. For example, when the light source LU (refer to, e.g., FIG. 12) is disposed in correspondence to the short side of the light guide plate LGP, the fixing parts BK may be disposed on the rest of the side surfaces (e.g., S2, S3, and S4) except for the side surface (e.g., S1), which is adjacent to the light source LU, of the light guide plate LGP. In other words, when the light source LU is disposed to face the first side surface S1, the fixing parts BK may be disposed on the two side surfaces S3 and S4 that correspond to a pair of long sides of the light guide plate LGP or disposed on the two side surfaces S3 and S4 that correspond to a pair of long sides of the light guide plate LGP and the second side surface S2 that corresponds to a short side of the light guide plate LGP.

In addition, when the light source LU (refer to, e.g., FIG. 12) is disposed in correspondence to one pair of short sides of the light guide plate LGP, the fixing parts BK may be disposed on the side surfaces S3 and S4 that corresponds to one pair of long sides of the light guide plate LGP. For example, the light source LU may be disposed adjacent to the pair of short sides of the light guide plate LGP.

Referring to FIG. 4, the fixing parts BK may be spaced apart from each other on the three side surfaces S1, S2, and S3 of the light guide plate LGP except for the fourth side surface S4. When a long side of the light guide plate LGP has a length of L, at least one fixing part BK may be disposed within a distance equal to or greater than about L/3 and equal to or less than about L/2 from one side surface of the light guide plate LGP. Further, L may be a real number greater than zero. For example, as illustrated in FIG. 4, at least one fixing part BK may be disposed on the long side at a distance between a length equal to or greater than about L/3 and a length equal to or less than about L/2 from the first side surface S1 and at a distance between a length equal to or greater than about L/3 and a length equal to or less than about L/2 from the second side surface S2 in the direction of the first directional axis DR1. In other words, in the display module DM according to an exemplary embodiment of the present invention, at least one fixing part BK may be disposed at a position between a length equal to or greater than about L/3 from the first side surface S1 and a length equal to or less than about L/2 from the first side surface S1 in the direction of the first directional axis DR1. In addition, at least one fixing part BK may be disposed at a position between a length greater than about L/2 from the first side surface S1 and a length equal to or less than about 2L/3 from the first side surface S1 of the light guide plate LGP in the direction of the first directional axis DR1. In addition, the fixing part BK may be disposed on an edge adjacent to each of the first side surface S1 and the second side surface S2. In other words, a plurality of fixing parts BK may be arranged in the direction of the first directional axis DR1 that is an extension direction of the long sides of the light guide plate LGP and may be spaced apart from each other. For example, at least four fixing parts BK may be disposed on a side surface (e.g., S3) corresponding to a long side of the light guide plate LGP in the direction of the first directional axis DR1.

In the display module DM according to an exemplary embodiment of the present invention, as at least one fixing part BK is disposed within a distance equal to or greater than about L/3 and equal to or less than about L/2 with respect to one side surface of the light guide plate LGP, a coupling force between the light guide plate LGP and the display panel DP may be maintained. For example, when the display module DM is curved to have a predetermined radius of curvature to provide the curved display device, as at least one fixing part BK is disposed within a distance equal to or greater than about L/3 and equal to or less than about L/2 with respect to one side surface of the light guide plate LOP, alignment between the light guide plate LGP and the display panel DP may not be misaligned and the coupling force between the light guide plate LGP and the display panel DP may be maintained, even when an external force is applied to provide the curved display device. In addition, the radius of curvature of each of the light guide plate LGP and the display panel DP may be maintained.

In addition, as at least four fixing parts BK are disposed on the side surface corresponding to a long side of the light guide plate LGP, the coupling force between the light guide plate LGP and the display panel DP may be maintained, and even when an external force is applied to the display module DM to provide the curved display module DM, the alignment and the coupling force between the light guide plate LGP and the display panel DP may be maintained.

Referring to FIG. 4, a plurality of fixing parts BK may be arranged, while being spaced apart from each other, in the second directional axis DR2 that is an extension direction of a short side of the light guide plate LGP. For example, three or more fixing parts BK may be disposed on each of the first side surface S1 and the second side surface S2, which correspond to the short sides of the light guide plate LGP. In this case, with reference to FIG. 4, on each of the first side surface S1 and the second side surface S2, one fixing part BK may be disposed at a central portion of each short side and disposed on edges of the third side surface S3 and the fourth side surface S4, respectively.

However, exemplary embodiments of the present invention are not limited to the arrangement number and arrangement position of the fixing parts BK in FIG. 4. For example, the arrangement number and arrangement position of the fixing parts BK may vary according to the size and shape of the display module DM.

Figure 5A:
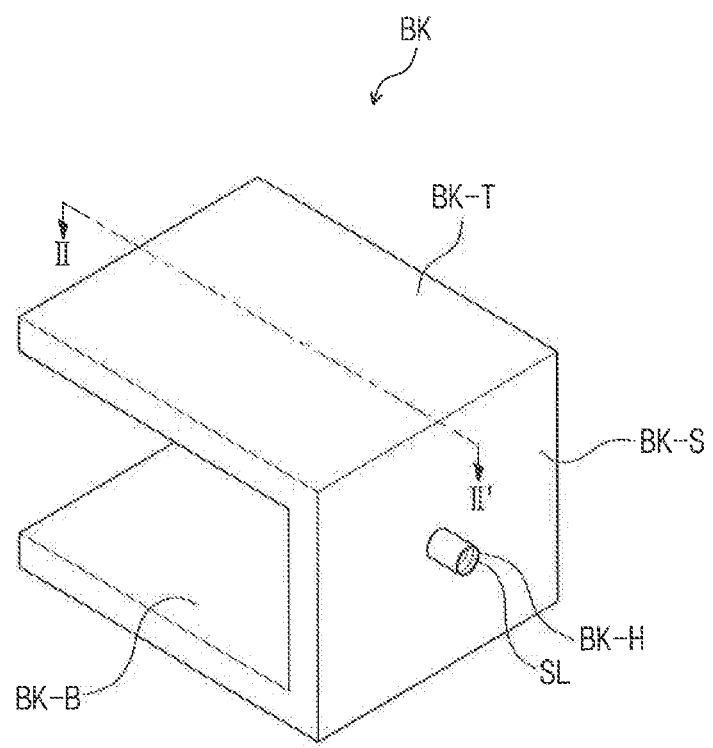
FIG. 5A is a perspective view illustrating a fixing part included in a display module according to an exemplary embodiment of the present invention.

FIGS. 5A, 5B, 5C, 5D and 5E are views illustrating the fixing part included in the display module DM according to an exemplary embodiment of the present invention. FIG. 5A is a perspective view illustrating a fixing part according to an exemplary embodiment of the present invention, and FIGS. 5B to 5E are cross-sectional views illustrating the fixing part according to an exemplary embodiment of the present invention.

Referring to FIGS. 5A to 5E, each of the fixing parts BK (BKa, BKb, and BKc) may include a sidewall portion BK-S, a bottom portion BK-B, and a ceiling portion BK-T. For example, the bottom portion BK-B may be bent and extended from one end of the sidewall portion BK-S. In addition, the ceiling portion BK-T may be bent and extended from the other end of the sidewall portion BK-S. The sidewall portion BK-S, bottom portion BK-B, and ceiling portion BK-T of each fixing part BK (BKa, BKb, and BKc) may be integrated with each other. For example, the fixing part BK may have a "⊏"-shape (e.g., staple-shape). However, the present invention is not limited thereto. For example, the fixing part BK may have a "U" shape.

Referring to FIGS. 5A to 5E, the bottom portion BK-B and the ceiling portion BK-T, which are bent and extended from one end and the other end of the sidewall portion BK-S, respectively, may extend parallel to each other, and an extension direction of the bottom portion BK-B may be the same as that of the ceiling portion BK-T.

Referring to FIGS. 2 to 5E, the sidewall portion BK-S of the fixing part BK, BKa, BKb, and BKc may face the side surface S1, S2, and S3 of the light guide plate LGP. For example, the fixing parts BK, BKa, BKb, and BKc may be spaced apart from each other on the three side surfaces S1, S2, and S3 of the light guide plate LGP. However, the fixing parts BK, BKa, BKb, and BKc may not be arranged on one side surface (e.g., the fourth side surface S4) corresponding to the light incident surface of the light guide plate LGP.

The fixing part BK, BKa, BKb, and BKc may further include a screw hole BK-H and BK-He. The screw hole BK-H and BK-He may be a portion to which a screw SC (refer to, e.g., FIG. 12) for coupling with the housing HS is inserted and fixed. A screw line SL may be provided inside the screw hole BK-H and BK-He.

Figure 5B:
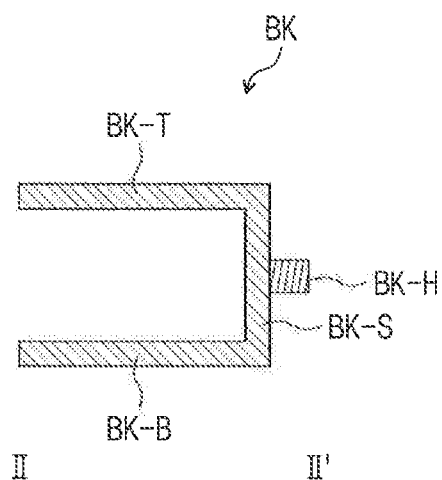
FIGS. 5B, 5C, 5D, and 5E are cross-sectional views illustrating a fixing part included in a display module according to an exemplary embodiment of the present invention.
Figure 5C:
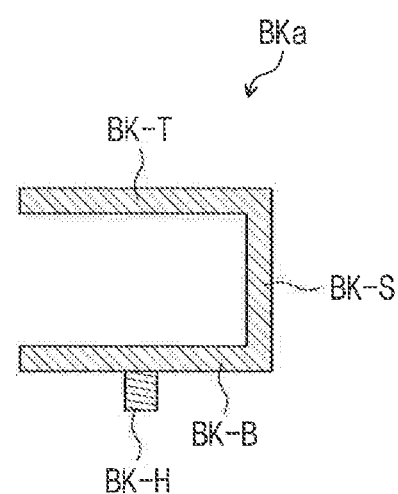
Figure 5D:
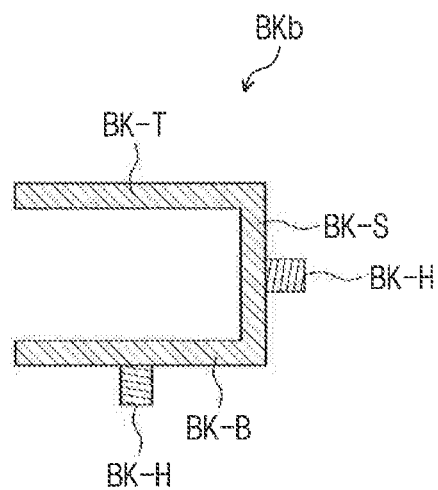
Figure 5E:
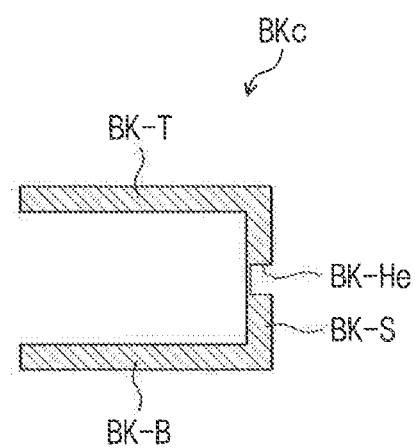
Figure 6:
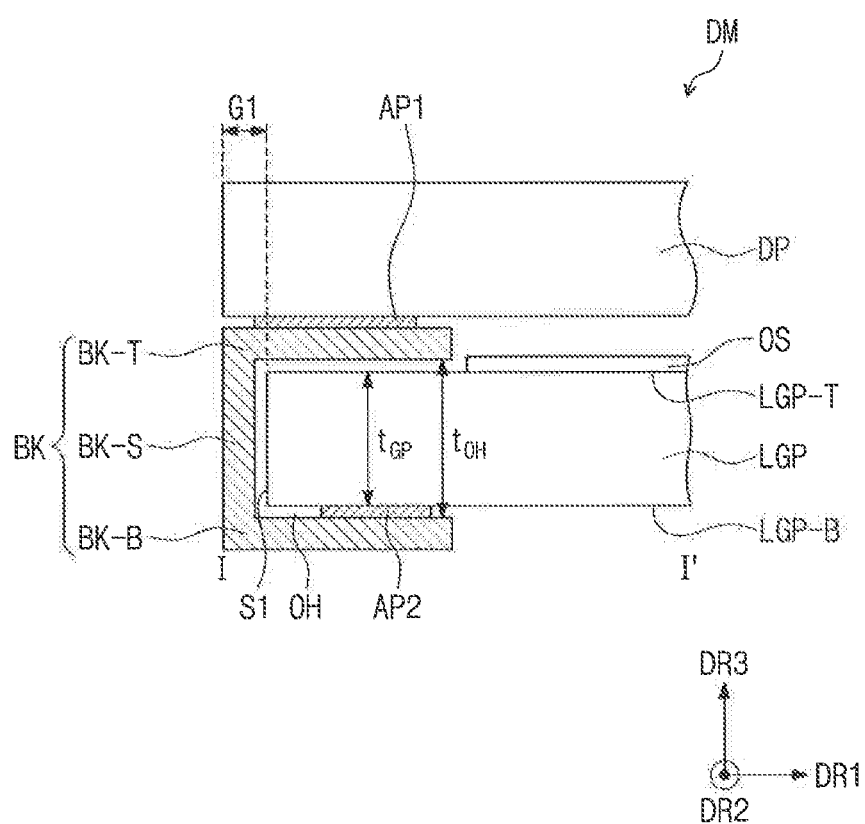
FIG. 6 is a cross-sectional view taken along line I-I' of FIG. 2 according to an exemplary embodiment of the present invention.

The screw hole BK-H may protrude from the sidewall portion BK-S or the bottom portion BK-B. However, the present invention is not limited thereto. For example, the screw hole BK-H may not protrude from the sidewall portion BK-S. FIG. 5B is a cross-sectional view taken along line II-II' of FIG. 5A. In the fixing part BK of FIGS. 5A and 5B, the screw hole BK-H may protrude from the sidewall portion BK-S. FIGS. 5C to 5E illustrate the fixing part BKa, BKb, and BKc included in the display module DM according to an exemplary embodiment of the present invention. The fixing part BKa in FIG. 5C may include the screw hole BK-H protruding from the bottom portion BK-B, and the fixing part BKb in FIG. 5D may include two the screw holes BK-H protruding from the bottom portion BK-B and the sidewall portion BK-S, respectively. In addition, the fixing part BKc in FIG. 5E may include a screw hole BK-He formed in the sidewall portion BK-S. According to an exemplary embodiment of the present invention, in the fixing part BKc in FIG. 5E, the screw hole BK-He may be a groove formed in the sidewall portion BK-S. Similar to FIGS. 5B to 5C, the screw hole BK-He of the fixing part BKc in FIG. 5E may be formed in the bottom portion BK-B or in both the bottom portion BK-B and the sidewall portion BK-S as a groove.

Exemplary embodiments of the present invention are not limited to the shape of the fixing part BK, BKa, BKb, and BKc in FIGS. 5A to 5E. For example, a height of the sidewall portion BK-S, an area of each of the bottom portion BK-B and the ceiling portion BK-T, or the like may vary according to the size and shape of each of the light guide plate LGP and the display panel DP. In addition, a position and a protruding length of the screw hole BK-H of the fixing part BK may vary according to the shape of the housing HS provided when the display device DD is manufactured.

FIG. 6 is a cross-sectional view taken along line I-I' of FIG. 2 according to an exemplary embodiment of the present invention. FIG. 6 is an enlarged cross-sectional view illustrating a portion of the display module DM including the display panel DP and the light guide plate LGP fixed to each other by the fixing part BK.

Referring to FIGS. 2 to 6, the display module DM according to an exemplary embodiment of the present invention may further include an optical sheet OS. The optical sheet OS may be disposed on a top surface LGP-T of the light guide plate LGP. The optical sheet OS may include plurality of laminated sheets. For example, the optical sheet OS may include a prism sheet and a diffusion plate.

In addition, the display module DM according to an exemplary embodiment of the present invention may further include an adhesion member AP1 and AP2. The adhesion member AP1 and AP2 may be disposed on at least one of a portion between the fixing part BK and the display panel DP or a portion between the fixing part BK and the light guide plate LGP. The adhesion member AP1 and AP2 may fix each of the display panel DP and the light guide plate LGP to the fixing part BK.

A first adhesion member AP1 may fix the fixing part BK to the display panel DP. The first adhesion member AP1 may fix the ceiling portion BK-T of the fixing part BK to the display panel DP. The first adhesion member AP1 may be disposed on each fixing part BK of the plurality of fixing parts BK that are spaced apart from each other. In other words, the first adhesion member AP1 may be provided in plurality, and the plurality of first adhesion members AP1 may be spaced apart from each other in correspondence to the plurality of fixing parts BK that are spaced apart from each other. For example, each first adhesion member AP1 may be disposed on a fixing part BK of the plurality of fixing parts BK. However, exemplary embodiments of the present invention are not limited thereto. For example, the first adhesion member AP1 may be disposed on an edge of the display panel DP. As an additional example, the first adhesion member AP1 may be disposed on an entire edge of the display panel DP.

The first adhesion member AP1 may have a light shielding function. For example, the first adhesion member AP1 may be a light shielding tape with adhesive on both sides of the tape. The first adhesion member AP1 may contain a black pigment or a dye to prevent light leakage.

A second adhesion member AP2 may fix the fixing part BK to the light guide plate LGP. The second adhesion member AP2 may fix the bottom portion BK-B of the fixing part BK to the light guide plate LGP. For example, the second adhesion member AP2 may be disposed on an inner side, facing the light guide plate LGP, of the bottom portion BK-B. The second adhesion member AP2 may be disposed on each fixing part BK of the plurality of fixing parts BK that are spaced apart from each other. However, exemplary embodiments of the present invention are not limited thereto. For example, the second adhesion members AP2 may be disposed on an entire edge of the light guide plate LGP. In addition, the second adhesion members AP2 may be omitted.

Referring to FIG. 6, one end of the light guide plate LGP may be inserted into an insertion space OH that is formed by the bottom portion BK-B, sidewall portion BK-S, and ceiling portion BK-T of the fixing part BK. The insertion space OH may have a height $t_{OH}$ that is greater than a thickness $t_{GP}$ of the light guide plate LGP. The height $t_{OH}$ of the insertion space OH may be greater than a sum of the thickness $t_{GP}$ of the light guide plate LGP and a thickness of the second adhesion member AP2. In addition, when the second adhesion member AP2 is omitted, the height $t_{OH}$ of the insertion space OH may be the same as the thickness $t_{GP}$ of the light guide plate LGP, and the light guide plate LGP may be fixed in the insertion space OH provided by the fixing part BK.

In an exemplary embodiment of the present invention, while referring to FIG. 6, the ceiling portion BK-T of the fixing part BK may overlap the light guide plate LGP and the display panel DP. The ceiling portion BK-T and bottom portion BK-B of the fixing part BK having a "⊏"-shape may overlap the light guide plate LGP and the display panel DP. For example, all of the ceiling portion BK-T and all of the bottom portion BK-B may overlap the light guide plate LGP and the display panel DP.

Referring to FIG. 6, a distance G1 between one side surface of the display panel DP and one side surface of the light guide plate LGP at one end of the display module DM may be greater than a thickness of the sidewall portion BK-S of the fixing part BK.

Hereinafter, a display module and the fixing part will be described with reference to FIGS. 7 to 11D, according to an exemplary embodiment of the present invention. In describing FIGS. 7 to 11, contents that may be similar to or the same as those described previously in FIGS. 1 to 6 may not be described again, and only different points may be described.

Figure 7:
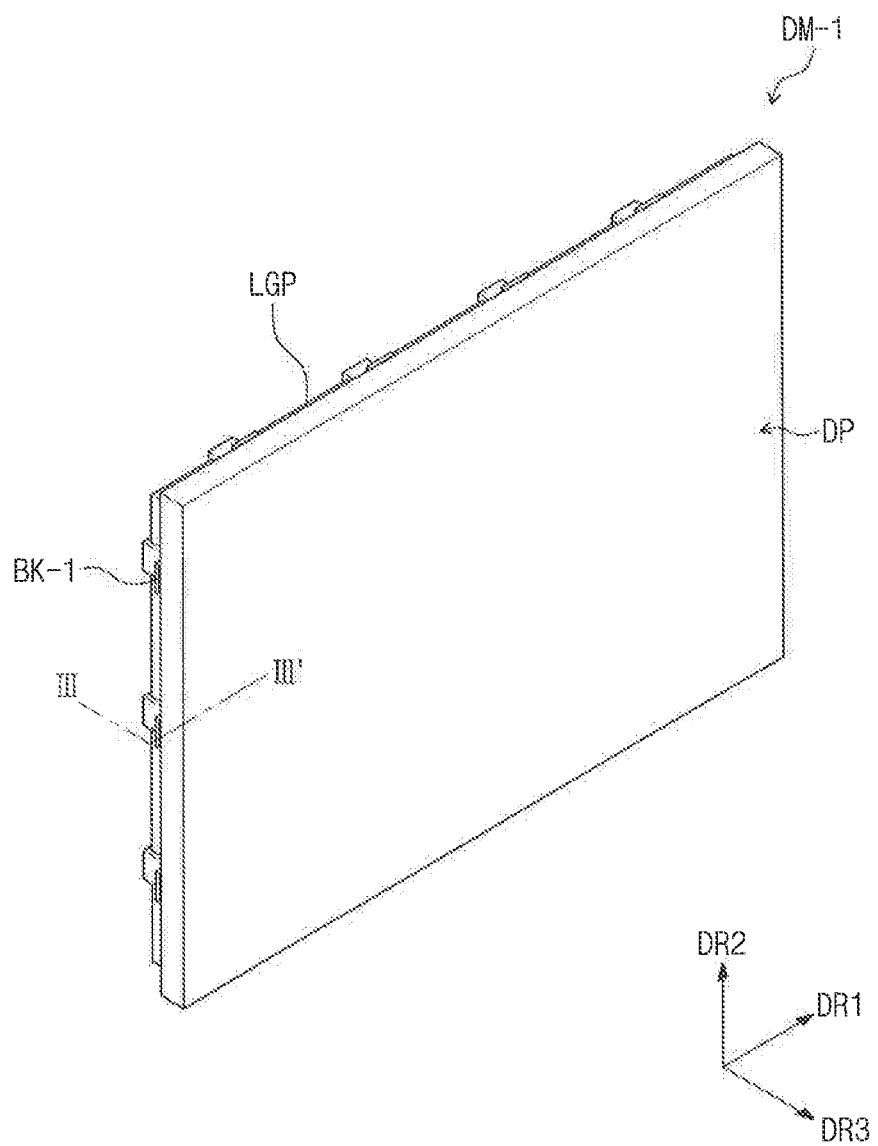
FIG. 7 is a perspective view illustrating a display module according to an exemplary embodiment of the present invention.
Figure 8:
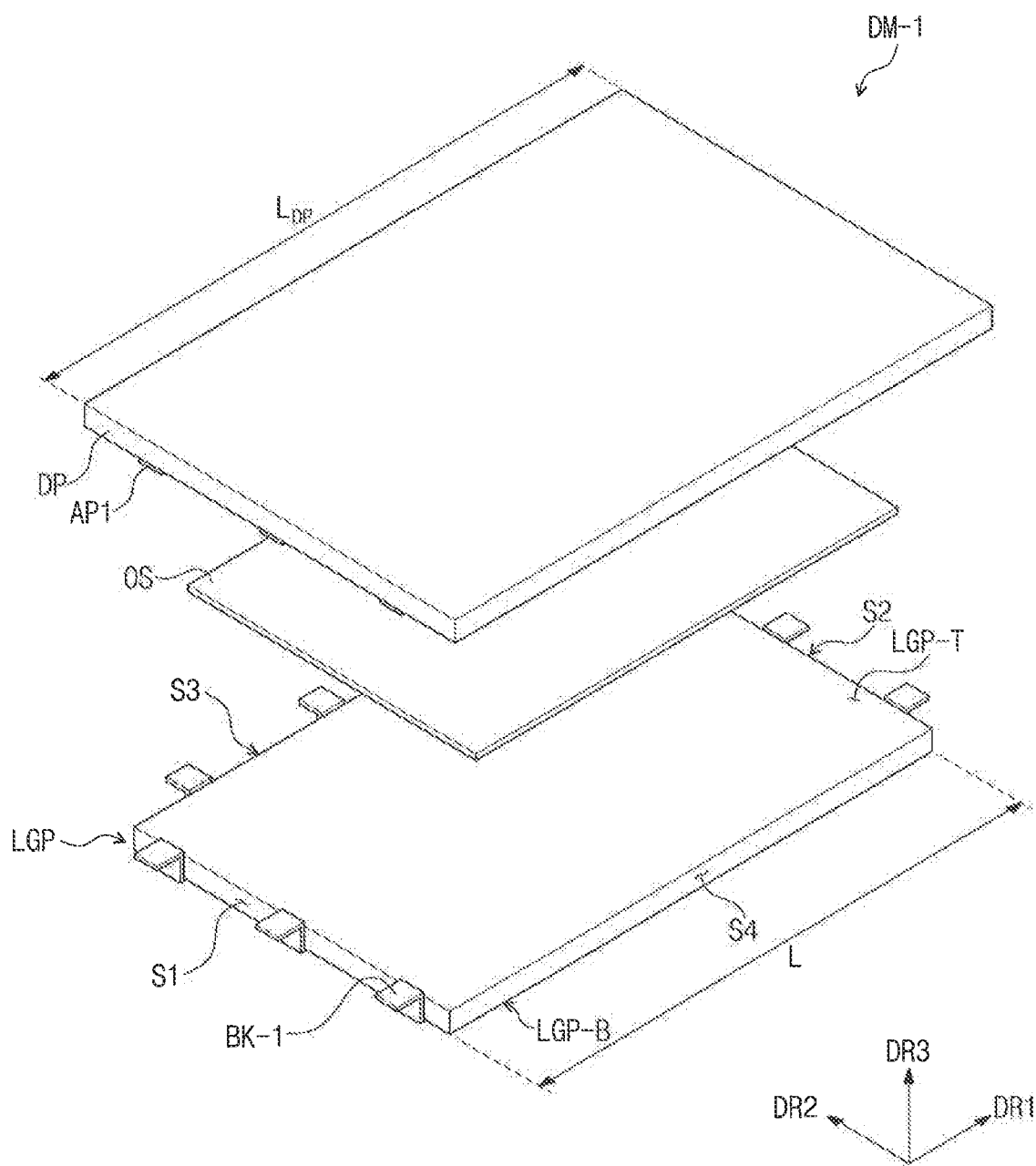
FIG. 8 is an exploded perspective view illustrating a display module according to an exemplary embodiment of the present invention.
Figure 9:
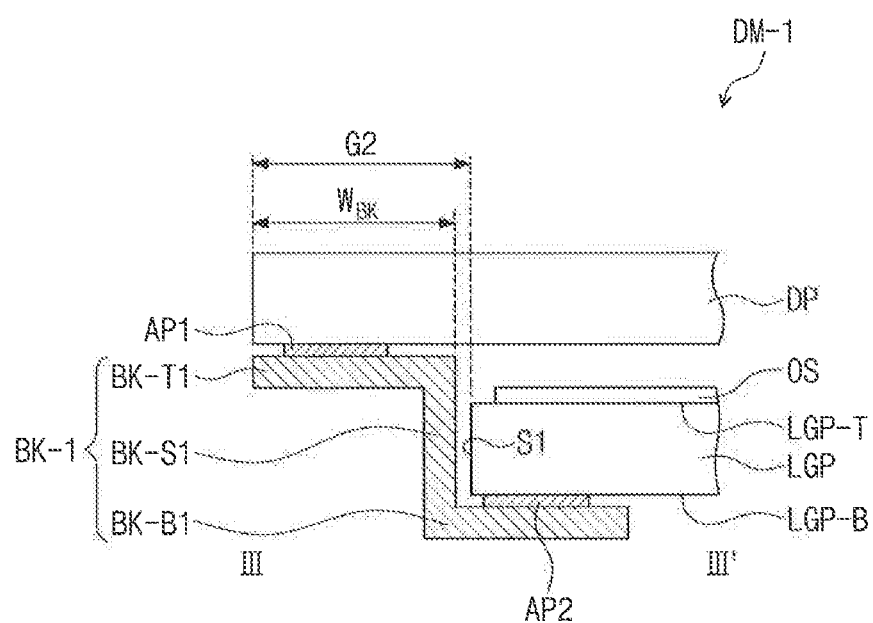
FIG. 9 is a cross-sectional view taken along line III-III' of FIG. 7 according to an exemplary embodiment of the present invention.
Figure 9:
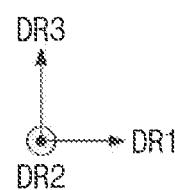
Figure 10:
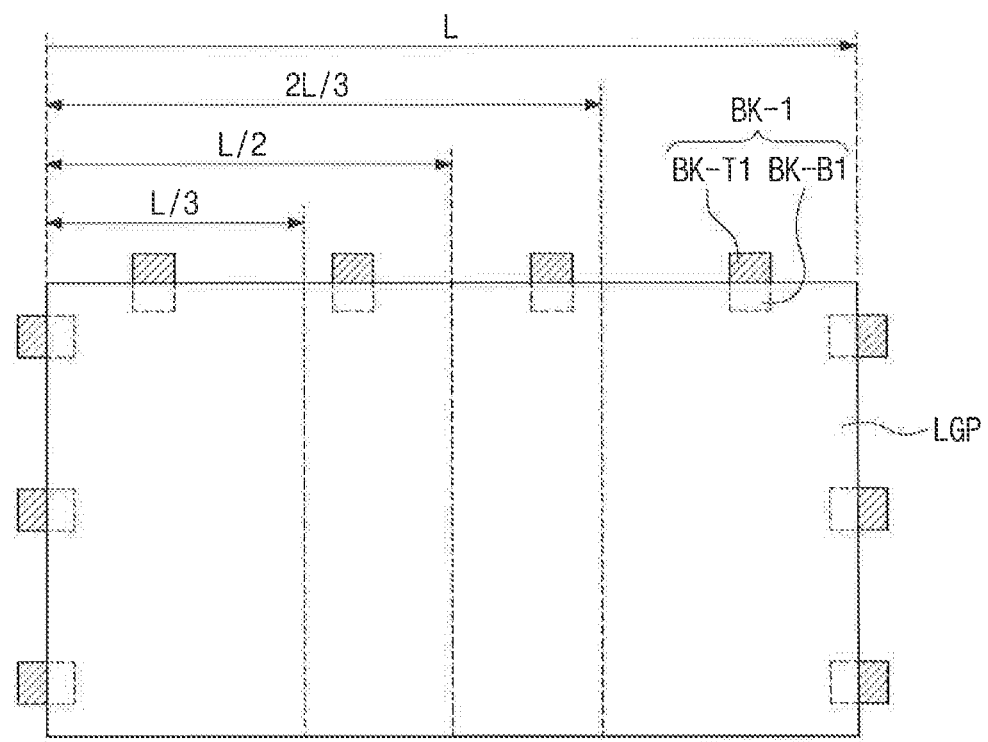
FIG. 10 is a plan view illustrating a light guide plate and a fixing part, which are included in a display module according to an exemplary embodiment of the present invention.
Figure 10:
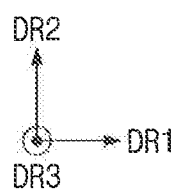

FIG. 7 is a perspective view illustrating a display module DM-1 according to an exemplary embodiment of the present invention. FIG. 8 is an exploded perspective view of the display module in FIG. 7 according to an exemplary embodiment of the present invention. FIG. 9 is a cross-sectional view taken long line III-III' of FIG. 7 according to an exemplary embodiment of the present invention. FIG. 10 is a plan view illustrating a light guide plate and a fixing part, which are included in the display module in FIG. 7 according to an exemplary embodiment of the present invention. FIGS. 11A to 11D are views illustrating the fixing part, which is included in the display module according to an exemplary embodiment of the present invention.

The display module DM-1 in FIGS. 7 to 10, according to an exemplary embodiment of the present invention, includes a fixing part BK-1 that is different in shape from that of the display module DM in FIGS. 2 to 6 according to an exemplary embodiment of the present invention.

Referring to FIGS. 7 and 8, the display module DM-1 according to an exemplary embodiment of the present invention may include a light guide plate LGP, a display panel DP disposed on the light guide plate LGP, and fixing parts BK-1 coupling an edge of the light guide plate LGP to an edge of the display panel DP. The fixing parts BK-1 may be arranged while being spaced apart from each other on all of the side surfaces S1, S2, and S3 of the light guide plate LGP except for the fourth side surface S4 that corresponds to a light incident surface.

In the display module DM-1 according to an exemplary embodiment of the present invention, the display panel DP may have an area equal to or greater than that of the light guide plate LGP on a plane. The display panel DP may have a long side that has a length $L_{DP}$ greater than a length L of a long side of the light guide plate LGP. In addition, the display panel DP may have a short side that has a length greater than that of a short side of the light guide plate LGP. Referring to FIG. 9, a distance G2 between the one side surface of the display panel DP and one side surface of the light guide plate LGP at one end of the display module DM-1 may be greater than the distance G1 between one side surface of the display panel DP and one side surface of the light guide plate LGP in the display module DM according to an exemplary embodiment of the present invention in FIG. 6.

The distance G2 between the display panel DP and the light guide plate LGP at one end of the display module DM-1 according to an exemplary embodiment of the present invention in FIG. 9 may be equal to or greater than a length $W_{BK}$ of the ceiling portion BK-T1 of the fixing part BK-1. Although only the one end of the display module DM-1 according to an exemplary embodiment of the present invention in FIGS. 7 and 8 is illustrated in FIG. 9, the distance G2 between the display panel DP and the light guide plate LGP may be described in a similar manner for other ends, at which the fixing parts BK-1 are disposed, of the display module DM-1.

FIG. 10 is a plan view illustrating the light guide plate LGP and the plurality of fixing parts BK-1 disposed on at least one side surface of the light guide plate LGP, which are included in the display module DM-1 according to an exemplary embodiment of the present invention. In an exemplary embodiment of the present invention, the ceiling portion BK-T1 of each of the fixing parts BK-1 may extend in a direction extending away from the light guide plate LGP.

As described in an exemplary embodiment of the present invention of FIGS. 4 and 10, the fixing parts BK-1 may be spaced apart from each other on the three side surfaces S1 S2, and S3 of the light guide plate LGP except the fourth side surface S4 that corresponds to the light incident surface. When the long side of the light guide plate LGP has a length of L, at least one fixing part BK-1 may be disposed within a distance equal to or greater than about L/3 and equal to or less than about L/2 with respect to one side surface of the light guide plate LGP. The above-described contents in FIG. 4 may be applied in a similar manner to the disposed position and disposed number of the fixing parts BK-1 on the light guide plate LGP in FIG. 10. In other words, in the display module DM-1 according to an exemplary embodiment of the present invention, at least one fixing part BK-1 may be disposed at a position between a length equal to or greater than about L/3 from the first side surface S1 and a length equal to or less than about L/2 from the first side surface S1 of the light guide plate LGP in the first directional axis DR1. In addition, at least one fixing part BK-1 may be disposed at a position between a length greater than about L/2 from the first side surface S1 and a length equal to or less than about 2L/3 from the first side surface S1 of the light guide plate LGP in the first directional axis DR1. In addition, the fixing part BK-1 may be disposed on an edge adjacent to each of the first side surface S1 and the second side surface S2. For example, at least four fixing parts BK-1 may be disposed on a side surface corresponding to the long side of the light guide plate LGP, and at least three fixing parts BK-1 may be disposed on each of the first side surface S1 and the second side surface S2, which correspond to the short sides of the light guide plate LGP, in the first directional axis DR1.

Referring to FIG. 9, the display module DM-1 according to an exemplary embodiment of the present invention may further include an optical sheet OS. The optical sheet OS may be disposed on a top surface LGP-T of the light guide plate LGP. In addition, the display module DM-1 according to an exemplary embodiment of the present invention may further include a first adhesion member AP1 disposed between the fixing part BK-1 and the display panel DP and a second adhesion member AP2 disposed between the fixing part BK-1 and the light guide plate LGP.

The first adhesion member AP1 may fix a ceiling portion BK-T1 of the fixing part BK-1 to the display panel DP. The second adhesion member AP2 may fix a bottom portion BK-B1 of the fixing part BK-1 to the light guide plate LGP. The first adhesion member AP1 may have a light shielding function. For example, the first adhesion member AP1 may be a light shielding tape that has adhesive on both of its sides. The first adhesion member AP1 may contain a black pigment or dye to prevent light leakage.

The above-described contents regarding the first and second adhesion members AP1 and AP2 in FIG. 6 may be applied to the first and second adhesion members AP1 and AP2 included in the display module DM-1 according to an exemplary embodiment of the present invention in FIG. 9. However, the display module DM-1 according to an exemplary embodiment of the present invention in FIG. 9 may not omit the second adhesion member AP2, unlike the display module DM according to an exemplary embodiment of the present invention in FIG. 6.

In an exemplary embodiment of the present invention of FIG. 9, the ceiling portion BK-T1 of the fixing part BK-1 may overlap the display panel DP and might not overlap the light guide plate LGP. In an exemplary embodiment of the present invention, the ceiling portion BK-T1 of the fixing part BK-1 may overlap only the display panel DP, and the bottom portion BK-B1 may overlap the display panel DP and the light guide plate LGP.

Figure 11A:
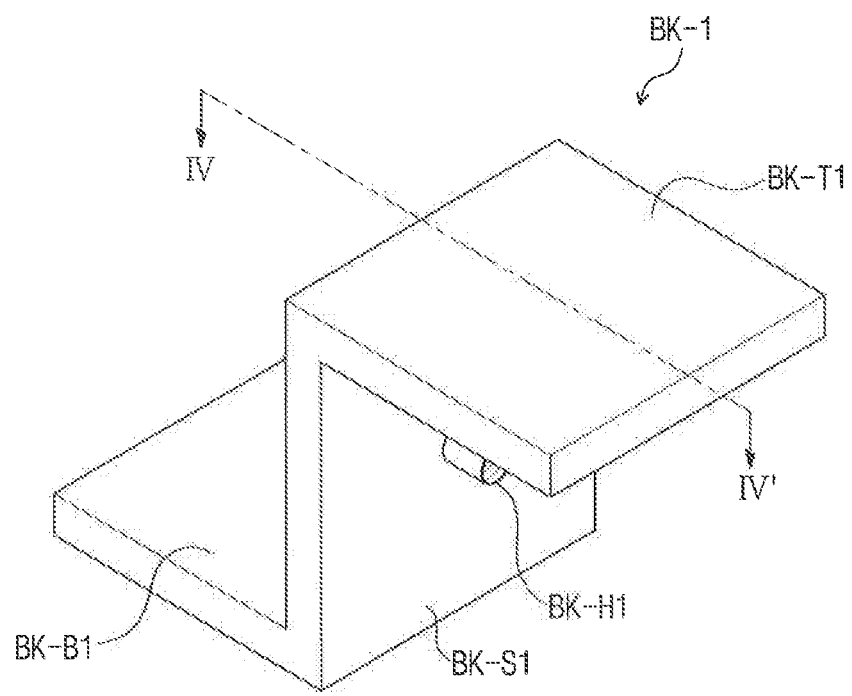
FIG. 11A is a perspective view illustrating a fixing part included in a display module according to an exemplary embodiment of the present invention.
Figure 11B:
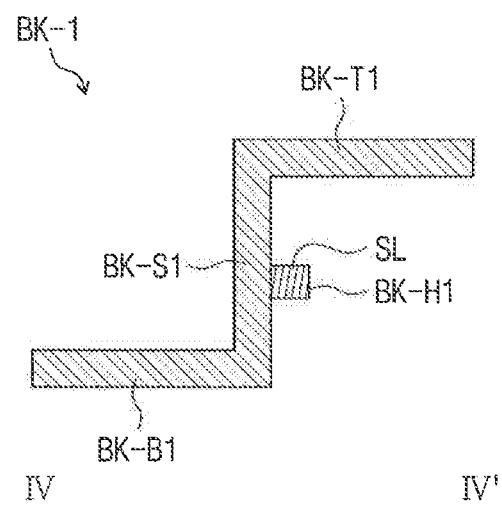
FIGS. 11B, 11C and 11D are cross-sectional views illustrating a fixing part included in a display module according to an exemplary embodiment of the present invention.
Figure 11C:
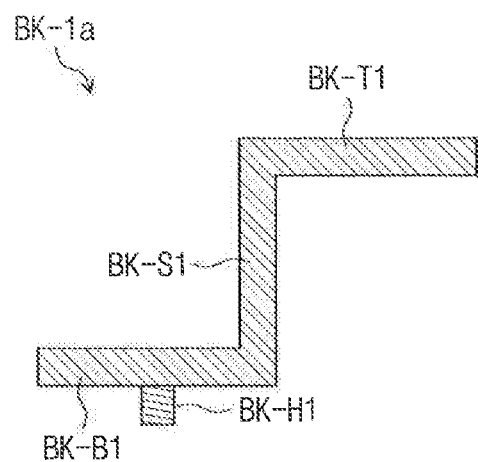
Figure 11D:
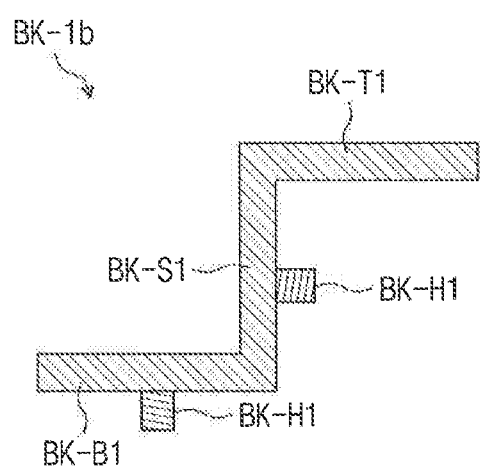

FIGS. 11A to 11D are views illustrating the fixing part, which is included in the display module DM according to an exemplary embodiment of the present invention. FIG. 11A is a perspective view illustrating a fixing part BK-1 included in the display module DM according to an exemplary embodiment of the present invention, and FIGS. 11B to 11D are cross-sectional views illustrating the fixing parts BK-1, BK-1a, and BK-1b according to an exemplary embodiment of the present invention.

Referring to FIGS. 11A to 11D, each of the fixing parts BK-1, BK-1a, and BK-1b may include a sidewall portion BK-S1, a bottom portion BK-B1, and a ceiling portion BK-T1. The bottom portion BK-B1 may be bent and extended from one end of the sidewall portion BK-S1. In addition, the ceiling portion BK-T1 may be bent and extended from the other end of the sidewall portion BK-S1. The sidewall portion BK-S1, bottom portion BK-B1, and ceiling portion BK-T1 of the fixing part BK-1, BK-1a, and BK-1b may be integrated with each other.

Referring to FIGS. 11A to 11D, the bottom portion BK-B1 and the ceiling portion BK-T1, which are bent and extended from one end and the other end of the sidewall portion BK-S1, respectively, may be in parallel to each other, and an extension direction of the bottom portion BK-B1 may be opposite to that of the ceiling portion BK-T1. Referring to FIGS. 9 to 10, the bottom portion BK-B1 may extend in an inward direction toward the light guide plate LGP, and the ceiling portion BK-T1 may extend in a direction extending away from the light guide plate LGP. For example, the ceiling portion BK-T1 may extend in a direction that protrudes from the light guide plate LGP.

As described in FIG. 9, the fixing part BK-1, BK-1a, and BK-1b in FIGS. 11A to 11D may couple the display panel DP, which has an area greater than that of the light guide plate LGP, to the light guide plate LGP.

The fixing part BK-1, BK-1a, and BK-1b in FIGS. 11A to 11D may further include a screw hole BK-H1. The screw hole BK-H1 may be a portion to which a screw SC (refer to, e.g., FIG. 12) is inserted and fixed to couple with the housing HS.

The screw hole BK-H1 may protrude from the sidewall portion BK-S1 or the bottom portion BK-B1. FIG. 11B is a cross-sectional view taken along line IV-IV' of FIG. 11A according to an exemplary embodiment of the present invention. In the fixing part BK-1 of FIGS. 11A and 11B, the screw hole BK-H1 may protrude from the sidewall portion BK-S1. The screw hole BK-H1 may protrude from the sidewall portion BK-S1 in the same direction as that of the ceiling portion BK-T1.

FIGS. 11C to 11D illustrate the fixing part according to exemplary embodiments of the present invention. The fixing part BK-1a in FIG. 11C may include the screw hole BK-H1 protruding from the bottom portion BK-B1, and the fixing part BK-1b in FIG. 11D may include two the screw holes BK-H1 protruding from the bottom portion BK-B1 and the sidewall portion BK-S1, respectively.

The exemplary embodiments of the present invention are not limited to the shape of the fixing part BK-1, BK-1a, BK-1b in FIGS. 11A to 11D. For example, a height of the sidewall portion BK-S1, an area of each of the bottom portion BK-B1 and the ceiling portion BK-T1, or the like may vary according to the size and shape of each of the light guide plate LGP and the display panel DP. In addition, a position and a protruding length of the screw hole BK-H1 of the fixing part BK-1 may vary according to the shape of the housing HS provided when the display device DD is manufactured.

As the above-described display module according to an exemplary embodiment of the present invention uses the plurality of fixing parts that are spaced apart from each other to fix the light guide plate to the display panel. The display module may be flexible such that the display module may be deformed in a state in which the light guide plate is coupled to the display panel in comparison with a case in which the fixing part is provided in an integrated manner. In other words, the display module according to an exemplary embodiment of the present invention includes the light guide plate, the display panel, and the plurality of spaced fixing parts coupling edges of the light guide plate and the display panel. The fixing parts may couple the light guide plate to the display panel and, at the same time, be applied to manufacture various types of display devices regardless of the shape of the housing such as a flat housing or a curved housing.

Hereinafter, a display device according to an exemplary embodiment of the present invention will be described with reference to FIGS. 12 to 17. In describing the display device according to an exemplary embodiment of the present invention, contents that may be similar to or the same as those regarding the display module according to an exemplary embodiment of the present invention, which are described previously in FIGS. 1 to 11D, may not be described again, and only different points may be described. Hereinafter, the contents regarding the display module, which are described in FIGS. 1 to 11D, may be applied in the same or similar manner to description regarding the display device according to an exemplary embodiment of the present invention in FIGS. 12 to 17.

Figure 12:
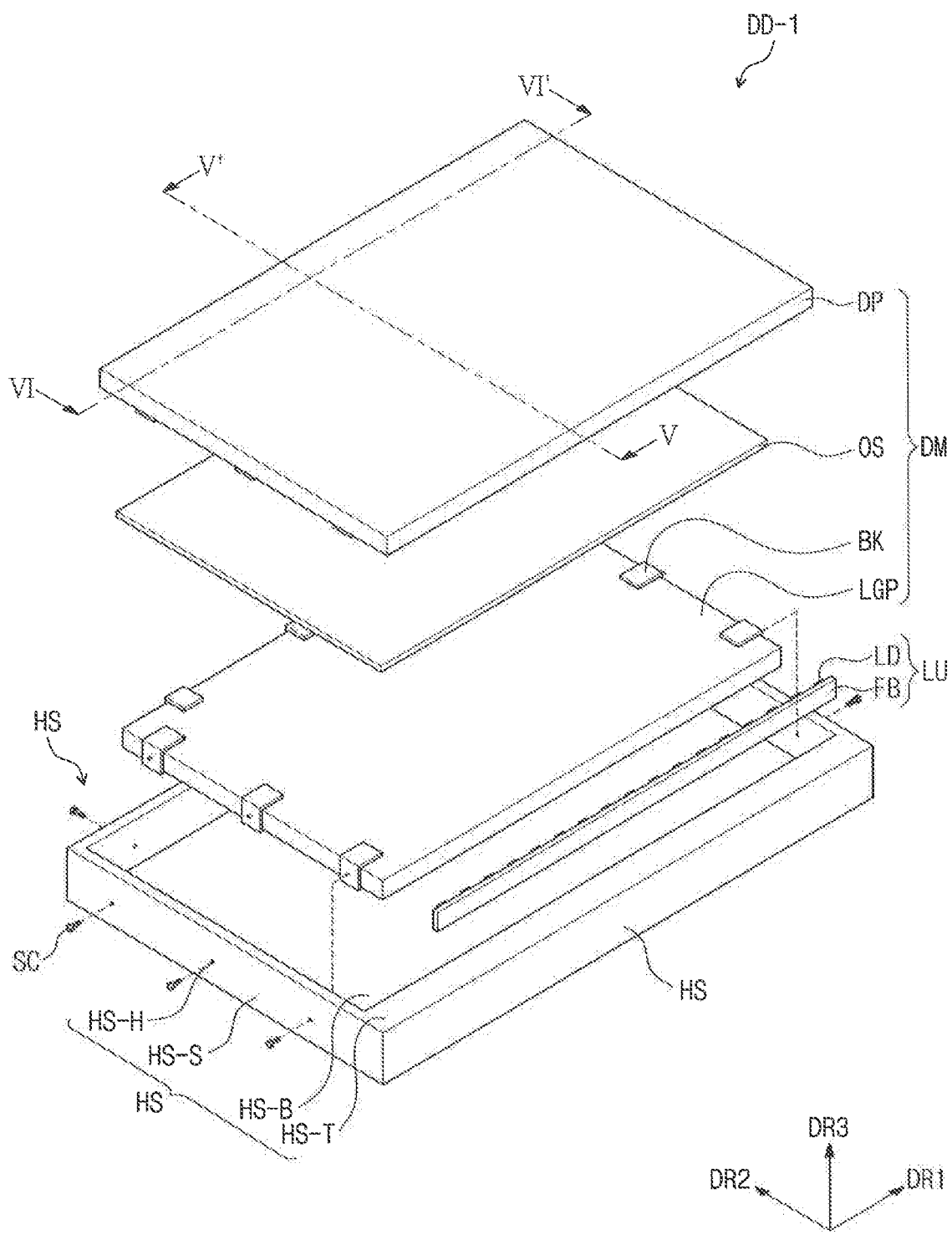
FIG. 12 is an exploded perspective view illustrating a display device according to an exemplary embodiment of the present invention.
Figure 13:
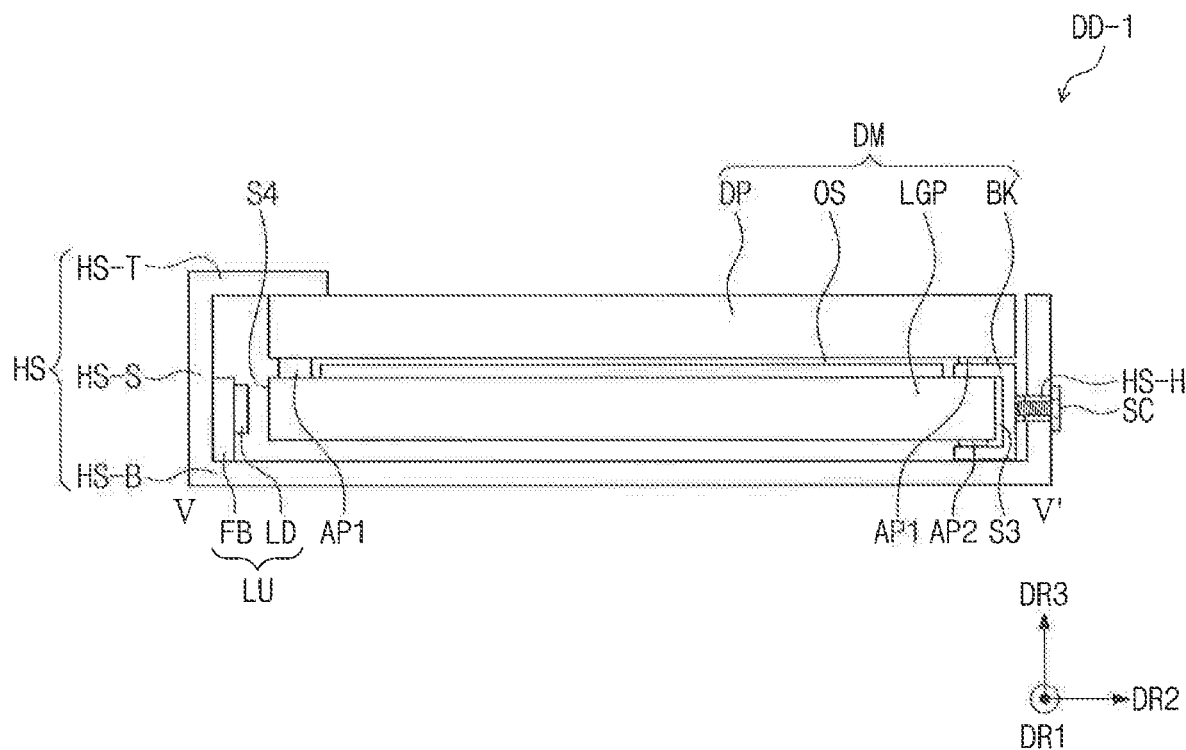
FIG. 13 is a cross-sectional view taken along line V-V' of FIG. 12 according to an exemplary embodiment of the present invention.
Figure 14:
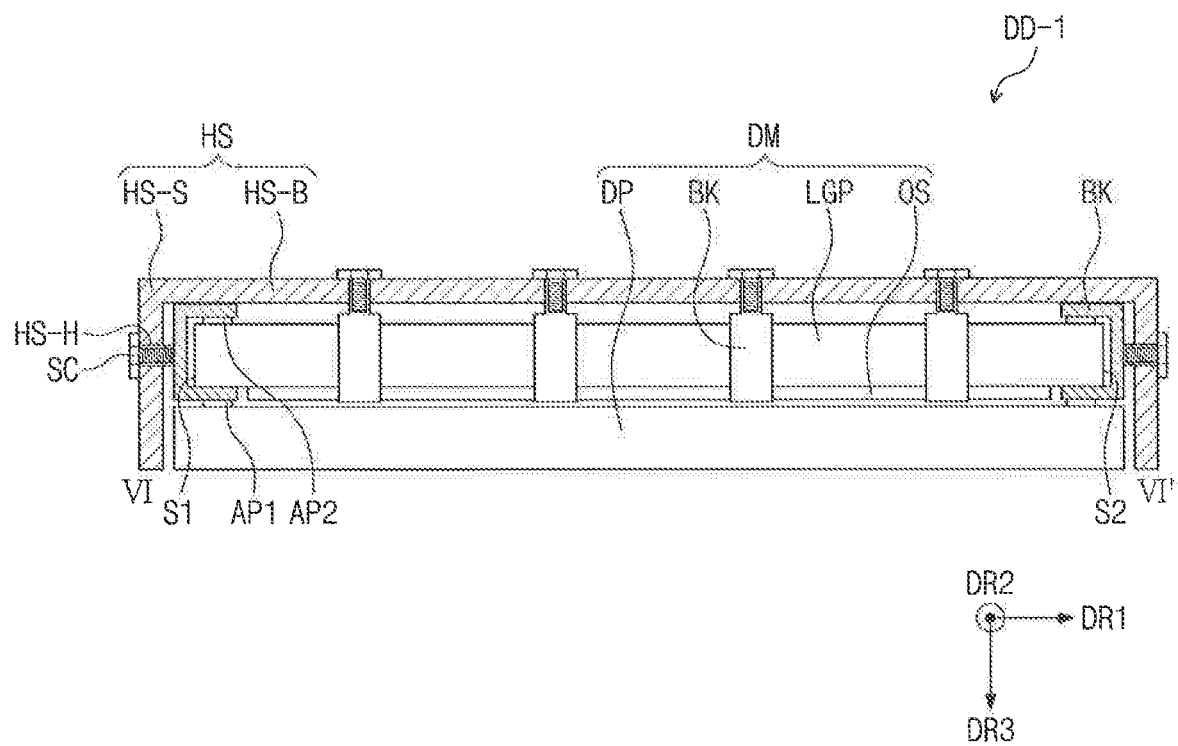
FIG. 14 is a cross-sectional view taken along line VI-VI' of FIG. 12 according to an exemplary embodiment of the present invention.

FIG. 12 is an exploded perspective view illustrating the display device according to an exemplary embodiment of the present invention. FIG. 13 is a cross-sectional view taken along line V-V' of FIG. 12 according to an exemplary embodiment of the present invention, and FIG. 14 is a cross-sectional view taken along line VI-VI' of FIG. 12 according to an exemplary embodiment of the present invention. A display device DD-1 according to an exemplary embodiment of the present invention may include a display module DM, a light source LU, and a housing HS.

The display module DM may include a light guide plate LGP, a display panel DP disposed on the light guide plate LGP, and a plurality of fixing parts BK disposed between an edge of the light guide plate LGP and an edge of the display panel DP. The contents regarding the display modules DM and DM-1 according to an exemplary embodiment of the present invention, which are described in FIGS. 1 to 11D, may be applied in the same or similar manner to the display module DM of the display device DD-1 according to an exemplary embodiment of the present invention in FIG. 12.

Each of the fixing parts BK may include: a sidewall portion BK-S facing a side surface of the light guide plate LGP; a bottom portion BK-B bent from one end of the sidewall portion BK-S to face one surface of the light guide plate LGP; and a ceiling portion BK-T bent from the other end of the sidewall portion BK-S to face one surface of the display panel DP. The fixing parts BK may be arranged on at least one side surface of the side surfaces S1, S2, and S3 of the light guide plate LGP except for one side surface S4 corresponding to the light incident surface through which light provided from the light source LU is incident.

Referring to FIG. 12, the fixing parts BK may be disposed on the first to third side surfaces S1, S2, and S3 of the light guide plate LGP. In other words, the fixing parts BK may be disposed on the remaining side surfaces S1, S2, and S3 excluding the fourth side surface S4 facing the light source LU.

The light guide plate LGP may have a rectangular shape having two long sides and two short sides on a plane. As described in FIG. 4, when each of the two long sides of the light guide plate LGP has a length of "L", at least one fixing part BK may be disposed on a position between a length equal to or greater than about L/3 and a length equal to or less than about L/2 from one end of the long side. When each of the two long sides of the light guide plate LGP has a length of "L", at least one fixing part BK may be disposed on each of a position between a length equal to or greater than about L/3 and a length equal to or less than about L/2 from one end of the long side and a position between a length greater than L/2 and/or a length equal to or less than about 2L/3. For example, in the display device DD-1 according to an exemplary embodiment of the present invention, four fixing parts BK may be disposed on one side surface corresponding to the long side of the light guide plate LGP, and three or more fixing parts BK may be disposed on one side surface corresponding to the short side of the light guide plate LGP.

Referring to FIGS. 12 to 14, an optical sheet OS may be disposed between the light guide plate LGP and the display panel DP. The optical sheet OS may be a plurality of laminated sheets. For example, the optical sheet OS may be manufactured such that a plurality of optical layers having functions different from each other are laminated with each other.

The light source LU may be disposed on one side of the display module DM. The light source unit LU may be disposed adjacent to one side of the light guide plate LGP. Referring to FIGS. 12 to 13, the light source LU may be adjacent to the fourth side surface S4 of the light guide plate LGP.

The light source LU includes a circuit board FB and a plurality of light emitting elements LD disposed on the circuit board FB. The light emitting elements LD may be mounted on the circuit board FB, and the circuit board FB may provide an electric signal to the light emitting elements LD. For example, the circuit board FB may provide a dimming signal and a driving voltage to the plurality of mounted light emitting elements LD mounted on the circuit board FB. The circuit board FB may include at least one insulation layer and at least one circuit layer. Each of the light emitting elements LD disposed on the circuit board FB may be a light emitting diode package including a light emitting chip. The light emitting elements LD may be spaced apart from each other in the direction of the first directional axis DR1.

The housing HS may accommodate the display module DM and the light source LU. The housing HS may include a housing bottom portion HS-B and a housing side portion HS-S. In addition, the housing HS may further include a housing ceiling portion HS-T.

The housing bottom portion HS-B may face the light guide plate LGP. The housing side portion HS-S may cover a side surface of the display module DM. The housing side portion HS-S may extend in the direction of the third directional axis DR3 that is a thickness direction of the display device DD-1 from the housing bottom portion HS-B. In addition, the housing HS may include at least one housing ceiling portion HS-T. The housing ceiling portion HS-T may extend from the housing side portion HS-S to cover a portion of a top surface of the display module DM. For example, the housing ceiling portion HS-T may extend from only one housing side portion HS-S. The housing ceiling portion HS-T may cover a portion of a display surface IS (refer to, e.g., FIG. 1) of the display module DM.

In the display device DD-1 according to an exemplary embodiment of the present invention, the housing HS may include a housing bottom portion HS-B covering a bottom surface of the display module DM, a housing side portion HS-S covering four side surfaces of the display module DM, and a housing ceiling portion HS-T extending from the housing side portion HS-S covering one side surface, adjacent to the light source LU, among the four side surfaces of the display module DM. However, exemplary embodiments of the present invention are not limited thereto. For example, the housing ceiling portion HS-T may extend from at least one side surface among other side surfaces except for the side surface adjacent to the light source LU to cover an edge of the display module DM in order to cover the display module DM. In other words, the housing ceiling portion HS-T may cover edges of the display module DM, except for the edge of the display module DM that is adjacent to the light source LU.

Here, the housing bottom portion HS-B, the housing side portion HS-S, and the housing ceiling portion HS-T may be integrated with each other. However, exemplary embodiments of the present invention are not limited thereto. For example, the housing bottom portion HS-B, the housing side portion HS-S, and the housing ceiling portion HS-T may be separately provided and assembled in a manufacturing process of the display device DD.

In an exemplary embodiment of the present invention, a groove HS-H may be formed in the housing side portion HS-S. The groove HS-H may be a hole formed in the housing side portion HS-S. The groove HS-H may be a portion to which a screw SC is inserted and fixed. A screw line may be provided on the groove HS-H. The housing HS and the display module DM may be coupled to each other by using the screw SC inserted into the groove HS-H. The screw SC may be inserted into the groove HS-H to couple the fixing part BK to the housing HS.

The groove HS-H may be formed in the housing side portion HS-S in correspondence to the screw hole BK-H of the fixing part BK. For example, the groove HS-H may align with the screw hole BK-H. The screw SC may be inserted into the screw hole BK-H of the fixing part BK and the groove HS-H, which are disposed on positions corresponding to each other, to fix the display module DM to the housing HS. The display module DM may be deformed into a shape corresponding to that of the housing HS by the screw coupling. In other words, the fixing parts BK of the display module DM may couple the light guide plate LGP to the display panel DP and allow the coupled light guide plate LGP and display panel DP to be disposed in the housing HS such that the light guide plate LGP and the display panel DP are fixed to the housing HS and correspond to the shape of the housing HS.

Figure 15:
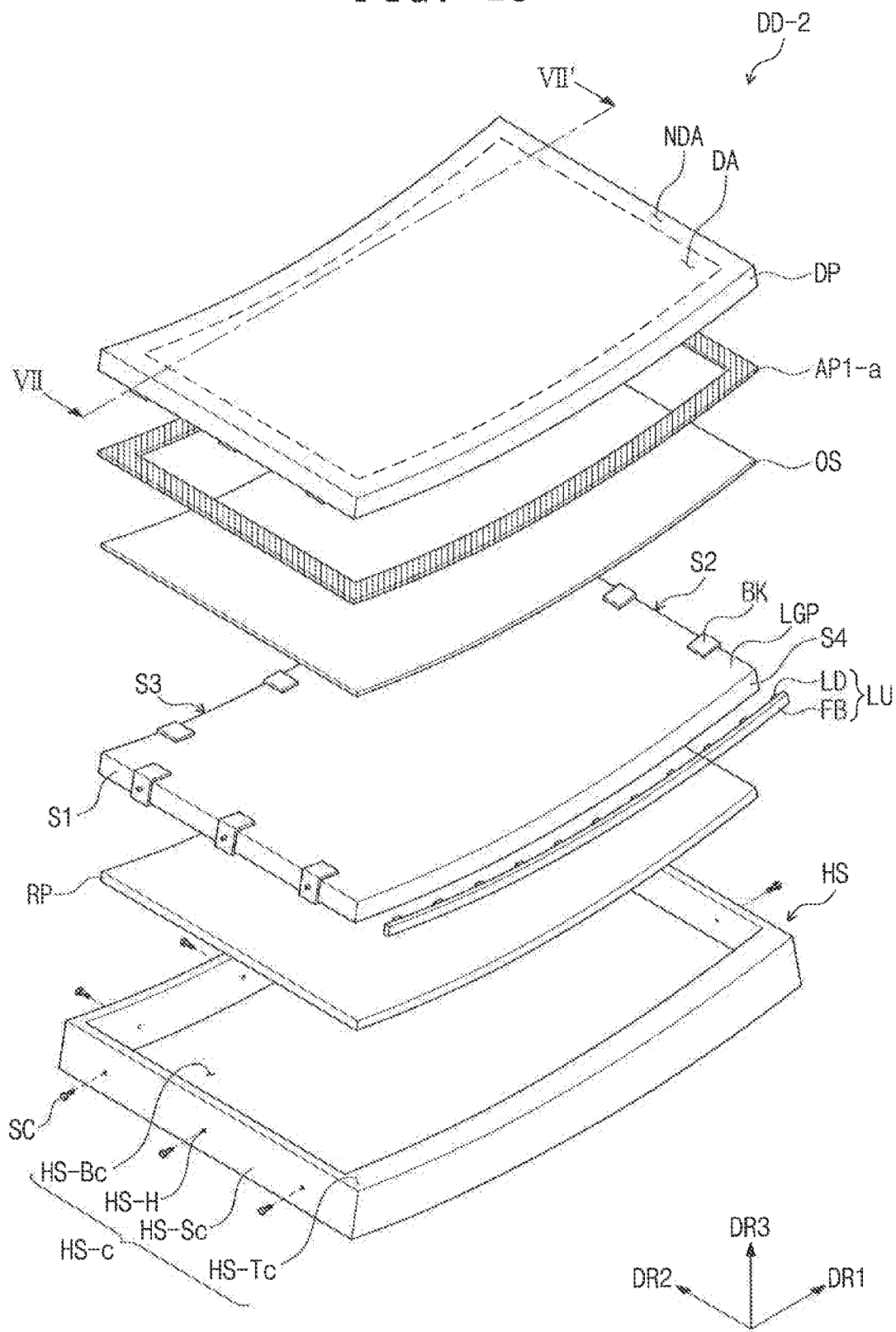
FIG. 15 is an exploded perspective view illustrating a display device according to an exemplary embodiment of the present invention.
Figure 16:
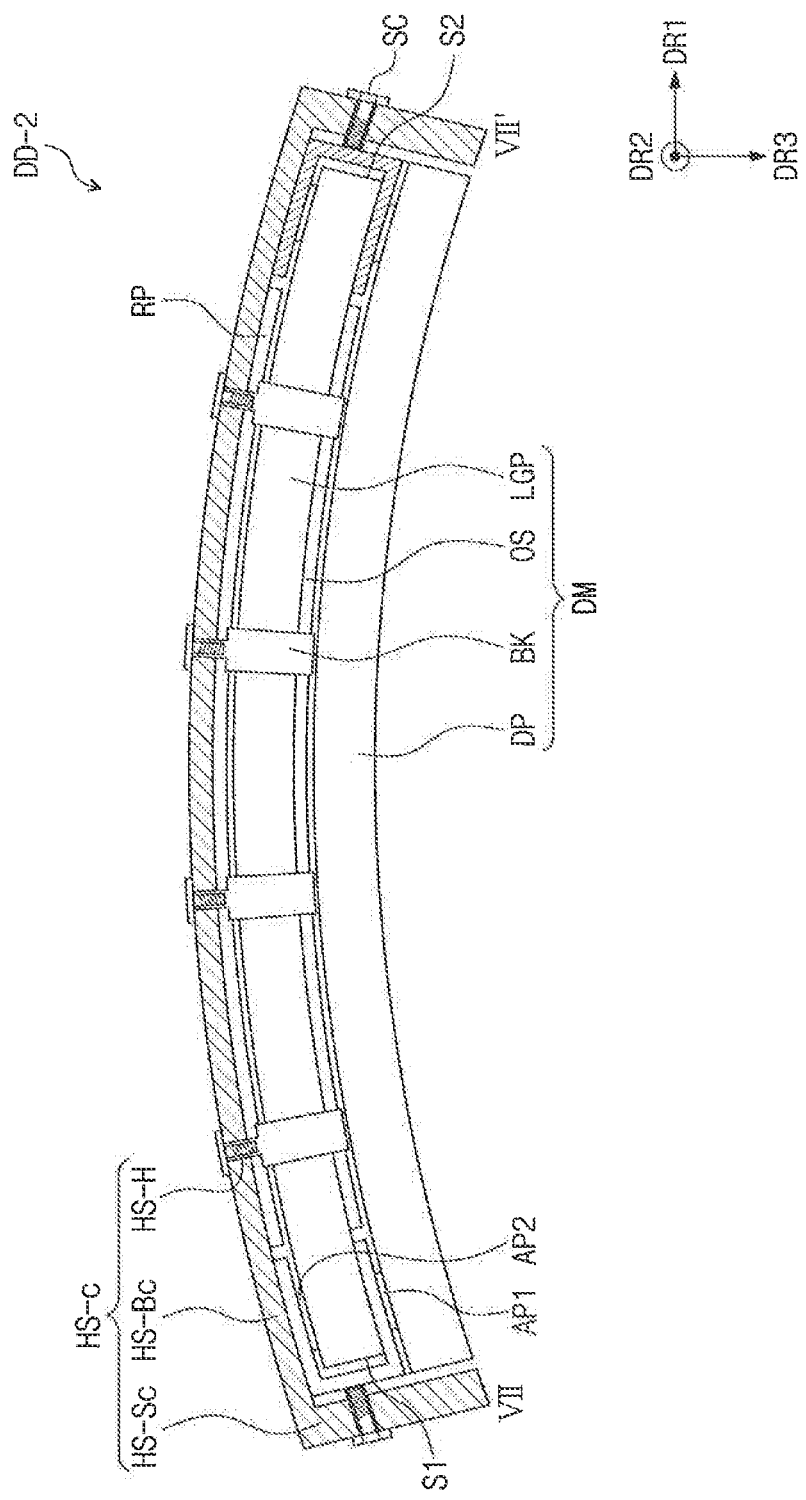
FIG. 16 is a cross-sectional view taken along line VII-VII' of FIG. 15 according to an exemplary embodiment of the present invention.

FIGS. 15 and 16 are views illustrating a display device according to an exemplary embodiment of the present invention. FIG. 15 is an exploded perspective view illustrating the display device according to an exemplary embodiment of the present invention, and FIG. 16 is a cross-sectional view taken along line VII-VII' of FIG. 15 according to an exemplary embodiment of the present invention.

Referring to FIGS. 15 and 16, a display device DD-2 according to an exemplary embodiment of the present invention may be a curved display device. The display device DD-2 according to an exemplary embodiment of the present invention may include a housing HS-c having a curved bottom surface, and a display module DM and a light source LU, which are accommodated in the housing HS-c.

The housing HS-c may include a housing bottom portion HS-Bc and a housing side portion HS-Sc, and the housing bottom portion HS-Bc may be curved to have a predetermined radius of curvature. In other words, the housing bottom portion HS-Bc may provide a curved bottom surface. The housing bottom portion HS-Bc may have a shape that is curved along the first directional axis DR1. However, exemplary embodiments of the present invention are not limited thereto. The housing bottom portion HS-Bc may provide a curved bottom surface that is curved in at least one direction of the first directional axis DR1 and the second directional axis DR2. The housing HS-c may further include a housing ceiling portion HS-Tc extending from the housing side portion HS-Sc to cover a portion of the display surface IS (refer to, e.g., FIG. 1) of the display module DM.

The housing HS-c may accommodate the display module DM and the light source LU disposed at one side of the display module DM. Referring to FIG. 15, the light source LU may face one side surface S4 of the light guide plate LGP. The housing ceiling portion HS-Tc may cover the light source LU.

In an exemplary embodiment of the present invention, the display module DM may include a light guide plate LGP that is curved in correspondence to the curved bottom surface of the housing HS-c and a display panel DP that is disposed on the light guide plate LGP and curved in correspondence to the curved housing bottom surface. A plurality of fixing parts BK may be disposed on the light guide plate LGP and spaced apart from each other. In addition, the plurality of fixing parts BK may be disposed between an edge of the curved light guide plate LGP and an edge of the curved display panel DP.

Each of the fixing parts BK may include: a side portion BK-S facing a side surface of the curved light guide plate LGP; a bottom portion BK-B bent from one end of the side portion BK-S to face one surface of the curved light guide plate LGP; and a ceiling portion BK-T bent from the other end of the side portion BK-S to face one surface of the curved display panel DP.

A first adhesion member AP1-a may be disposed between the fixing part BK and the display panel DP. The first adhesion member AP1-a may attach the display panel DP to the fixing part BK to couple the display panel DP to the light guide plate LGP.

Referring to FIG. 15, the first adhesion member AP1-a may be disposed adjacent to the edge of the display panel DP. The first adhesion member AP-1a may be disposed on edges corresponding to four sides of the display panel DP. The first adhesion member AP1-a may have a shape in which a portion corresponding to the display area DA is perforated. The first adhesion member AP1-a may be a light shielding tape. The first adhesion member AP1-a may be an adhesion tape containing a black pigment or dye.

Referring to FIGS. 15 and 16, the display device DD-2 according to an exemplary embodiment of the present invention may further include a second adhesion member AP2. The second adhesion member AP2 may be disposed between the light guide plate LGP and the fixing part BK. The second adhesion member AP2 may couple the light guide plate LGP and the fixing part BK to each other.

An optical sheet OS may be disposed on the light guide plate LGP. The optical sheet OS may be laminated on the light guide plate LGP to increase an efficiency of light that is provided from the light source LU and incident into the display panel DP or to collect the light in a direction of the front surface of the display panel DP.

The display device DD-2 according to an exemplary embodiment of the present invention may further include a reflective part RP. The reflective part RP may be disposed below the light guide plate LGP. The reflective part RP may be accommodated in the housing HS-c and disposed between the housing bottom portion HS-Bc and the light guide plate LGP. The reflective part RP may be a reflective sheet type. In addition, the reflective part RP may be disposed on the bottom surface of the light guide plate LGP and may be a reflective layer type. The reflective part RP may reflect light incident to the reflective part RP to guide the light toward the display panel DP, thereby increasing an optical efficiency of the display device DD-2. Although not shown in FIGS. 12 to 14, the display device DD-1 according to an exemplary embodiment of the present invention in FIGS. 12 to 14 may further include the reflective part RP below the light guide plate LGP.

The light source LU may include a circuit board FB and a plurality of light emitting elements LD disposed on the circuit board FB. In an exemplary embodiment of the present invention, the circuit board FB may be curved along a direction of the first directional axis DR1. For example, the circuit board FB may be curved to have substantially the same shape as the curved bottom surface of the housing HS-c. The plurality of light emitting elements LD may be arranged in a curved direction of the circuit board FB.

A groove HS-H may be formed in the housing side portion HS-Sc. A screw SC may be inserted into the groove HS-H. The groove HS-H may be provided on a position corresponding to the screw hole BK-H of the fixing part BK. The screw SC may be inserted and coupled to the groove HS-H and the screw hole BK-H to couple the display module DM to the housing HS-c.

The display panel DP and the light guide plate LGP, which are coupled by the fixing parts BK, may be provided in a curved state or in a flat state. The display panel DP and the light guide plate LGP may be deformed in correspondence to the curvature of the curved housing HS-c in an assembly process of the display device DD-2. In addition, the display module DM and the housing HS-c may be coupled to each other by the plurality of fixing parts BK that are spaced apart from each other. Fixing parts BK including the screw hole BK-H may be fixed to the display module DM and the housing HS-c by the screw SC inserted into the screw hole BK-H and the groove HS-H of the housing HS-c corresponding to the screw hole BK-H, thereby forming the curved display device DD-2.

Referring to FIGS. 15 and 16, at least four fixing parts BK may be disposed in a direction of the first directional axis DR1, which is a direction of a long side of the display device DD-2. At least four fixing parts BK may be disposed on the third side surface S3 of the light guide plate LGP, which faces the light incident surface in the display device DD-2 according to an exemplary embodiment of the present invention. The fixing parts BK are disposed on the third side surface S3 to couple the display panel DP to the light guide plate LGP and to allow the display module DM to be deformed and fixed in correspondence to the curved bottom surface of the housing HS-c.

Figure 17A:
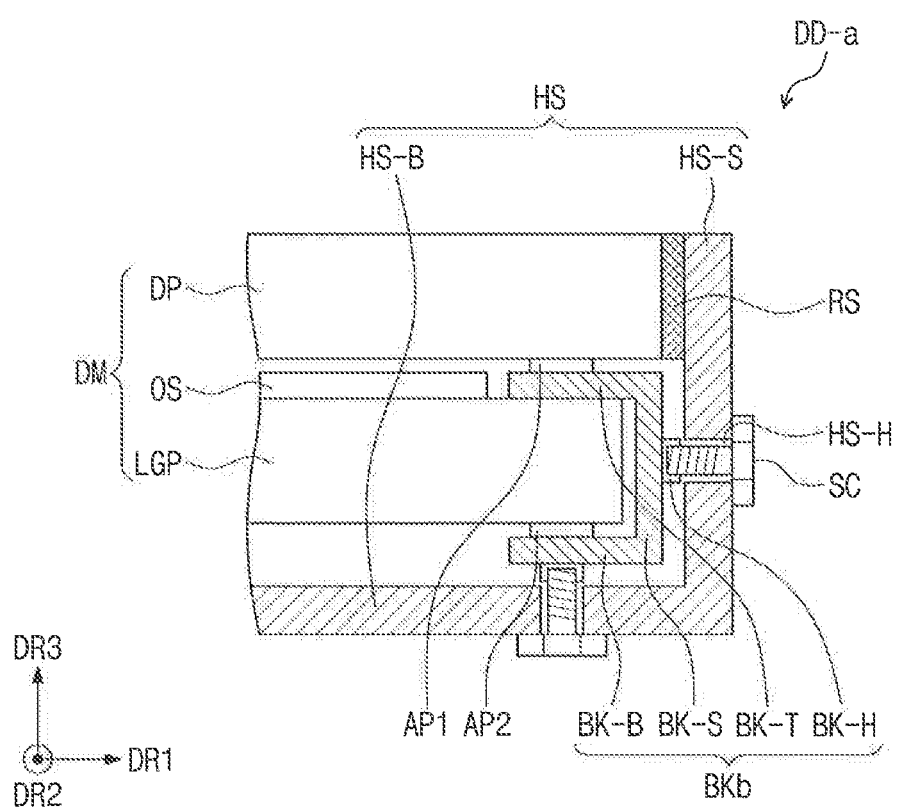
FIGS. 17A, 17B and 17C are cross-sectional views illustrating a portion of a display device according to an exemplary embodiment of the present invention.
Figure 17B:
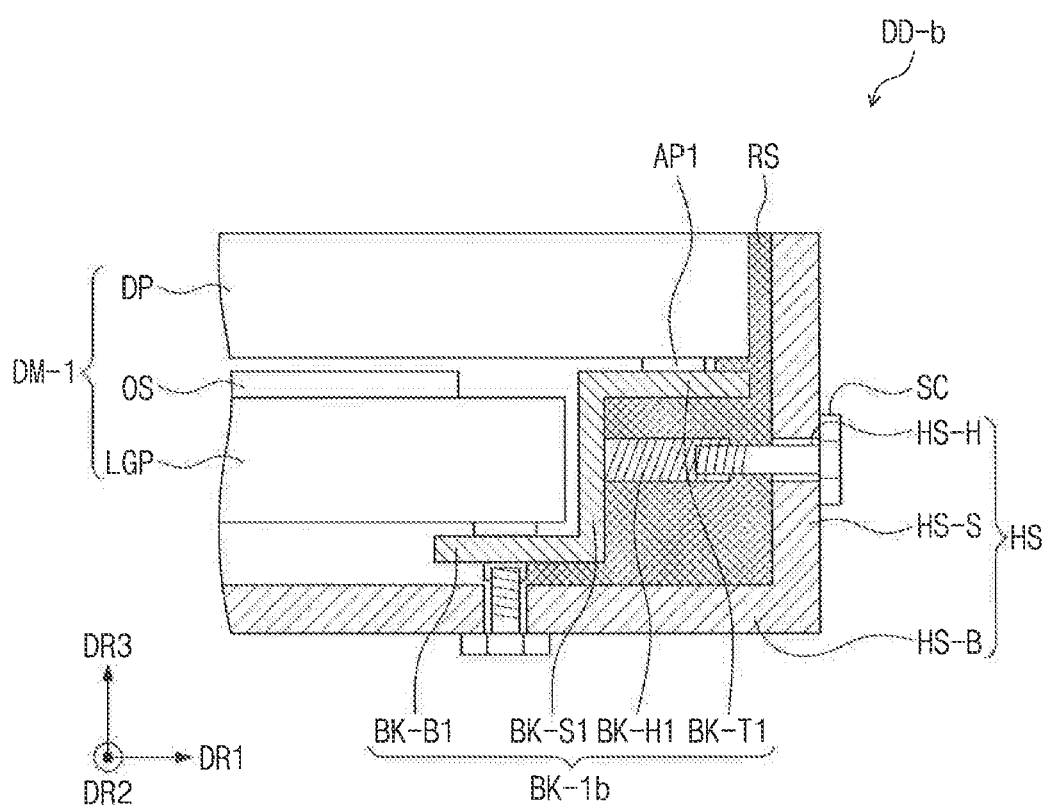
Figure 17C:
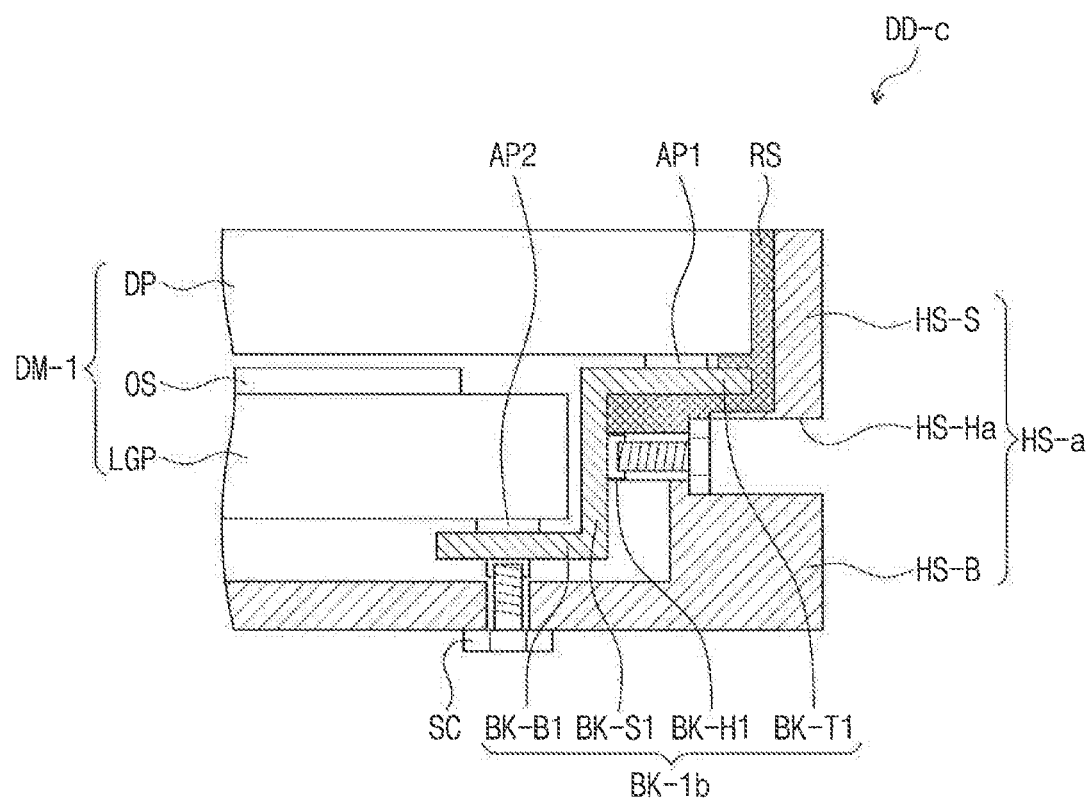

FIGS. 17A to 17C are enlarged cross-sectional views illustrating one side end of a display device according to an exemplary embodiment of the present invention. A display device DD-a, DD-b, and DD-c according to an exemplary embodiment of the present invention in FIGS. 17A to 17C may be a portion of the display device DD-1 and DD-2 according to an exemplary embodiment of the present invention in FIG. 12 or 15.

Referring to FIGS. 17A to 17C, the display module DM and DM-1 may include the fixing part BKb and BK-1b and be coupled to the housing HS. The screw SC inserted into the groove HS-H of the housing HS may be fixed to the screw hole BK-K of the fixing part BKb and the screw hole BK-H1 of the fixing part BK-1b. The display device DD-a, DD-b, and DD-c according to an exemplary embodiment of the present invention in FIGS. 17A to 17C may further include an adhesion resin RS. The adhesion resin RS may be filled between the housing side portion HS-S and the display module DM.

The adhesion resin RS may be a polymer resin. For example, the adhesion resin RS may be an acryl-based resin or a silicon-based resin. The adhesion resin RS may contain a light shielding material. The adhesion resin RS may include a polymer resin as a base and further include a black pigment or dye, which is dispersed in the polymer resin. The adhesion resin RS may be filled into a space between the housing side portion HS-S and the display module DM to decrease a light leakage phenomenon and increase a coupling force between the housing HS and the display module DM. In addition, the adhesion resin RS may be disposed into the space between the housing side portion HS-S and the display module DM to increase impact resistance.

FIG. 17A is a cross-sectional view illustrating the display device DD-a including the fixing part BKb that is previously described in FIG. 5D, according to an exemplary embodiment of the present invention. The fixing part BKb may include a sidewall portion BK-S, a bottom portion BK-B, a ceiling portion BK-T, and a screw hole BK-H. The display module DM and the housing HS may be coupled to each other by the screw SC inserted into the groove HS-H, which is formed in the housing side portion HS-S and the housing bottom portion HS-B, and the screw hole BK-H. The adhesion resin RS may be filled into a space between the display panel DP and the housing side portion HS-S.

FIG. 17B is a cross-sectional view illustrating the display device DD-b including the fixing part BK-1b that is previously described in FIG. 11D, according to an exemplary embodiment of the present invention. The fixing part BK-1b may include a sidewall portion BK-S1, a bottom portion BK-B1, a ceiling portion BK-T1, and a screw hole BK-H1. In the display device DD-b according to an exemplary embodiment of the present invention, the adhesion resin RS may be disposed into an empty space between the display module DM-1 and the housing HS. In the display device DD-b according to an exemplary embodiment of the present invention, the adhesion resin RS may be disposed into an empty space between the display panel DP and the housing side portion HS-S and an empty space between the fixing part BK-1b and the housing HS.

In the display device DD-c according to an exemplary embodiment of the present invention in FIG. 17C, the housing HS-a may include a housing bottom portion HS-B, a housing side portion HS-S, and a groove HS-Ha. The groove HS-Ha of the housing HS-a according to an exemplary embodiment of the present invention in FIG. 17C is inserted toward the light guide plate LGP further than the housing side portion HS-S in comparison with that in FIGS. 17A and 17B. In the display device DD-c according to an exemplary embodiment of the present invention in FIG. 17C, the groove HS-Ha of the housing HS-a may overlap the display panel DP. For example, the groove HS-Ha may overlap the bottom surface of the display panel DP. In the display device DD-c according to an exemplary embodiment of the present invention, as the screw SC is fixed to the groove HS-Ha and inserted toward the light guide plate LGP, the screw SC may be prevented from protruding toward a side surface of the display device DD-c. For example, the screw SC may be prevented from protruding beyond the housing side portion HS-S. In the display device DD-c according to an exemplary embodiment the present invention, the adhesion resin RS may be filled between the display panel DP and the housing side portion HS-S and between the fixing part BK-1b and the housing side portion HS-S.

The display device according to an exemplary embodiment of the present invention may include the sidewall portion, the bottom portion, and the ceiling portion to allow the display panel and the light guide plate to be easily coupled. In addition, as the display device according to an exemplary embodiment of the present invention includes the display module including the display panel and the light guide plate, which are coupled by the plurality of fixing parts. The fixing parts are spaced apart from each other, and the shape of the fixing part of the display module is deformed according to the shape of the housing when the display device is manufactured. In other words, the display module including the display panel and the light guide plate, which are coupled by the plurality of fixing parts, according to an exemplary embodiment of the present invention may be used for manufacturing the flat display device and the curved display device. Thus, according to an exemplary embodiment of the present invention, since the display module and the housing may be easily assembled, the display device may be realized in various shapes.

While the present invention has been particularly shown and described with reference to exemplary embodiments thereof, it will be apparent to those of ordinary skill in the art that various changes in form and detail may be made thereto without departing from the spirit and scope of the present invention as defined by the following claims.

What is claimed is:

1. A display module comprising:
   a light guide plate;
   a display panel disposed on the light guide plate; and
   a plurality of fixing parts disposed between an edge of the light guide plate and an edge of the display panel,
   wherein the fixing parts are spaced apart from each other, and
   each of the fixing parts comprises:
   a sidewall portion facing a side surface of the light guide plate;
   a bottom portion extended from a first end of the sidewall portion to face the light guide plate; and
   a ceiling portion extended from a second end, opposite the first end, of the sidewall portion to face the display panel,
   wherein the ceiling portion is attached to a lower surface of the display panel.

2. The display module of claim 1, wherein the light guide plate comprises: a top surface and a bottom surface, which face each other; and
   a plurality of side surfaces disposed between the top surface and the bottom surface, the plurality of side surfaces comprising a light incident surface, and
   wherein the fixing parts overlap the plurality of side surfaces except for the light incident surface.

3. The display module of claim 1, wherein the light guide plate has a rectangular shape having first and second long sides and first and second short sides,
   the first long side has a length of L, and at least one of the fixing parts is disposed on the first long side at a distance between a length equal to or greater than about L/3 and a length equal to or less than about L/2 from a first end of the first long side.

4. The display module of claim 3, wherein at least one of the fixing parts is disposed on the first long side at a distance from the first end of the first long side between a length greater than about L/2 and a length equal to or less than about 2L/3 from the first end of the first long side.

5. The display module of claim 3, wherein at least four fixing parts are disposed on the first long side.

6. The display module of claim 1, wherein the bottom portion and the ceiling portion are parallel to each other, and the bottom portion has an extension direction that is the same as that of the ceiling portion.

7. The display module of claim 1, wherein the bottom portion and the ceiling portion are parallel to each other, and the bottom portion has an extension direction that is opposite to that of the ceiling portion.

8. The display module of claim 1, wherein the ceiling portion overlaps the light guide plate and the display panel.

9. The display module of claim 1, wherein the bottom portion overlaps the light guide plate and the display panel, and
the ceiling portion does not overlap the light guide plate and overlaps the display panel.

10. The display module of claim 1, wherein each of the fixing parts further comprises a first screw hole.

11. The display module of claim 10, wherein the first screw hole protrudes from the sidewall portion or the bottom portion.

12. The display module of claim 1, further comprising an optical sheet disposed between the light guide plate and the display panel.

13. The display module of claim 1, further comprising an adhesion member disposed between the light guide plate and the bottom portion of each fixing part and between the ceiling portion of each fixing part and the display panel.

14. A display device comprising:
a display module comprising a light guide plate, a display panel disposed on the light guide plate, and a plurality of fixing parts overlapping the light guide plate and the display panel;
a light source disposed at one side of the display module; and
a housing configured to accommodate the display module and the light source,
wherein the fixing parts are spaced apart from each other, and
each of the fixing parts comprises:
a sidewall portion facing a side surface of the light guide plate;
a bottom portion extended from a first end of the sidewall portion and bent with respect to the sidewall portion to face the light guide plate; and
a ceiling portion extended from a second end, opposite the first end, of the sidewall portion and bent with respect to the sidewall portion to face the display panel,
wherein, the light guide plate comprises a plurality of side surfaces comprising a light incident surface, and
the fixing parts are disposed on the plurality of side surfaces except for the light incident surface.

15. The display device of claim 14, wherein the light guide plate has a rectangular shape having two long sides and two short sides,
a first long side of the two long sides has a length of L, and at least one of the fixing parts is disposed on the first long side at a distance between a length equal to or greater than about L/3 and a length equal to or less than about L/2 front a first end of the first long side.

16. The display device of claim 14, wherein the housing comprises:
a housing bottom portion facing the light guide plate;
a housing side portion covering a side surface of the display module; and
a groove in the housing side portion, wherein the groove is configured to receive a screw to couple the housing to a fixing part of the plurality of fixing parts.

17. The display device of claim 16, wherein an adhesion resin is disposed between the housing side portion and the display module.

18. The display device of claim 16, wherein each of the fixing parts further comprises a screw hole protruding from the sidewall portion or the bottom portion, and
the screw hole overlaps the groove.

19. A display device comprising:
a housing comprising a curved bottom surface;
a display module disposed in the housing; and
a light source disposed in the housing and disposed at one side of the display module,
wherein the display module comprises:
a light guide plate curved in correspondence to the curved bottom surface;
a display panel disposed on the light guide plate and curved in correspondence to the curved bottom surface; and
a plurality of fixing parts attached to an end of the curved light guide plate and an end of the curved display panel, wherein the plurality of fixing parts are spaced apart from each other, and
each of the fixing parts comprises:
a sidewall portion facing a side surface of the curved light guide plate;
a bottom portion extended from a first end of the sidewall portion and forming a first angle with respect to the sidewall portion to face the curved light guide plate; and
a ceiling portion extended from a second end, opposite the first end, of the sidewall portion and forming a second angle with respect to the sidewall portion to face the curved display panel.

20. The display module of claim 19, wherein the bottom portion is attached to a lower surface of the light guide plate, and the ceiling portion is attached to a lower surface of the display panel.

\* \* \* \* \*